US 12,237,564 B2

(12) United States Patent
Yoo et al.

(10) Patent No.: US 12,237,564 B2
(45) Date of Patent: Feb. 25, 2025

(54) ANTENNA AND ELECTRONIC DEVICE INCLUDING SAME

(71) Applicant: SAMSUNG ELECTRONICS CO., LTD., Suwon-si (KR)

(72) Inventors: Chaeup Yoo, Suwon-si (KR); Hyungjin Kim, Suwon-si (KR); Chongo Yoon, Suwon-si (KR); Yoonjung Kim, Suwon-si (KR); Taeyoon Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 189 days.

(21) Appl. No.: 18/119,126

(22) Filed: Mar. 8, 2023

(65) Prior Publication Data

US 2023/0223678 A1    Jul. 13, 2023

Related U.S. Application Data

(63) Continuation of application No. PCT/KR2021/011929, filed on Sep. 3, 2021.

(30) Foreign Application Priority Data

Sep. 9, 2020   (KR) .................. 10-2020-0115249

(51) Int. Cl.
*H01Q 1/12*   (2006.01)
*H01Q 1/24*   (2006.01)
*H01Q 9/04*   (2006.01)

(52) U.S. Cl.
CPC ........... *H01Q 1/1207* (2013.01); *H01Q 1/243* (2013.01); *H01Q 9/045* (2013.01)

(58) Field of Classification Search
CPC ....... H01Q 1/1207; H01Q 1/243; H01Q 9/045
See application file for complete search history.

(56) References Cited

U.S. PATENT DOCUMENTS

| 6,256,481 B1 * | 7/2001 | Jeong .................. H04M 1/0216 455/575.3 |
| 7,085,139 B2 * | 8/2006 | Chen .................... H01Q 1/1207 439/830 |

(Continued)

FOREIGN PATENT DOCUMENTS

KR   20-0424639 Y1   8/2006

OTHER PUBLICATIONS

Communication dated Jul. 18, 2024, issued by the Korean Intellectual Property Office in Korean Patent Application No. 10-2020-0115249.

*Primary Examiner* — Graham P Smith
*Assistant Examiner* — Amal Patel
(74) *Attorney, Agent, or Firm* — Sughrue Mion, PLLC

(57) ABSTRACT

An electronic device includes: a housing; a substrate disposed in the housing; an antenna radiator; and an electrical connection member electrically interconnecting the antenna radiator and the substrate, wherein the electrical connection member includes: a plate portion including a first surface facing the antenna radiator and a second surface facing away from the first surface; a first fixing portion provided at a first end of the plate portion, the first fixing portion including a through hole and a tension structure; and a second fixing portion provided at a second end of the plate portion and electrically connecting the electrical connection member to the substrate, wherein the first fixing portion is fixed to the antenna radiator via a locking device that passes through the through hole, and wherein the tension structure is configured to contact the antenna radiator and maintain tension between the electrical connection member and the antenna radiator during fastening of the locking device.

20 Claims, 25 Drawing Sheets

(56) References Cited

U.S. PATENT DOCUMENTS

| | | | |
|---|---|---|---|
| 9,853,377 B2* | 12/2017 | Kim | ......................... H05K 1/02 |
| 2013/0257659 A1* | 10/2013 | Darnell | ................. H05K 1/028 |
| | | | 343/702 |

* cited by examiner

ANTENNA AND ELECTRONIC DEVICE INCLUDING SAME

CROSS-REFERENCE TO RELATED APPLICATIONS

This application is a by-pass continuation of International Application No. PCT/KR2021/011929, filed on Sep. 3, 2021, which is based on and claims priority to Korean Patent Application No. 10-2020-0115249, filed on Sep. 9, 2020, in the Korean Intellectual Property Office, the disclosures of which are incorporated by reference herein in their entireties.

BACKGROUND

1. Field

The disclosure relates to an antenna and an electronic device including the same.

2. Description of Related Art

An electronic device may include a plurality of electronic function groups and/or electrical structures. Electronic components and/or electrical structures included in an electronic device may be arranged in a state of being spaced apart from each other by a predetermined interval in an inner space of the electronic device and electrically connected to each other via an electrical connection member. Through this spaced arrangement, the electronic components and/or electric structures may be free from mutual interference and may be efficiently designed.

At least some conductive structures arranged in an electronic device may be electrically connected to a substrate disposed nearby via an electrical connection member. For example, at least some conductive structures electrically connected to a substrate may be used as an antenna radiator for communication via at least one wireless communication circuit disposed on the substrate. A conductive structure used as an antenna radiator may maintain physical contact with a peripheral substrate via an electrical connection member. For example, the electrical connection member may include a metal plate having a predetermined shape, and may be connected to a conductive structure via an electrical connection structure such as a C-clip, a different metal, or soldering.

However, when a conductive contact such as a C-clip is used, an impedance value required for an antenna may not be maintained, and the conductive contact may be difficult to apply when the conductive structure is disposed relatively far from the substrate. In addition, when connected via a different metal, desensing due to galvanic corrosion may occur, which may cause deterioration in radiation performance of an antenna. In addition, when an electrical connection member is fixed to a conductive structure through soldering, maintenance may be difficult.

An electrical connection member may be used when it is relatively far away from a substrate in the inner space of the electronic device, and may be fixed via a locking device such as a screw to secure physical contact reliability with a conductive structure used as an antenna radiator.

However, when the electronic device is used for a long period of time or is subjected to an external impact, the locking device fastened to the conductive structure may be loosened and released, a defect may occur in the electrical connection between the conductive structure and the electrical connection member, and as a result, the radiation performance of the antenna may be deteriorated.

SUMMARY

Provided are an antenna having an electrical connection structure capable of being resistant to an external impact or being used for a long period of time, and an electronic device including the same.

According to an aspect of the disclosure, an electronic device includes: a housing; a substrate disposed in the housing; an antenna radiator; and an electrical connection member electrically interconnecting the antenna radiator and the substrate, wherein the electrical connection member includes: a plate portion including a first surface facing the antenna radiator and a second surface facing away from the first surface; a first fixing portion provided at a first end of the plate portion, the first fixing portion including a through hole and a tension structure; and a second fixing portion provided at a second end of the plate portion and electrically connecting the electrical connection member to the substrate, wherein the first fixing portion is fixed to the antenna radiator via a locking device that passes through the through hole, and wherein the tension structure is configured to contact the antenna radiator and maintain tension between the electrical connection member and the antenna radiator during fastening of the locking device.

The tension structure may include at least one tension rib extending from the first surface of the plate portion or the first fixing portion at a first angle.

The at least one tension rib may extend from an end of the first fixing portion.

The first fixing portion may include an opening spaced apart from the through hole, and wherein the at least one tension rib extends into the opening.

The tension structure may include at least one tension rib extending in a direction parallel to the first surface from the through hole.

The at least one tension rib may have a curved shape.

The at least one tension rib may have a curvature that is smaller than a curvature of an inner diameter of the through hole.

The at least one tension rib may protrude beyond a plane defined by the first surface in a direction toward the antenna radiator.

The tension structure may include a bend in the plate portion, and the through hole is disposed between an end of the first fixing portion and the bend.

The antenna radiator may have a fastening hole in which the locking device is inserted to fix the first fixing portion to the antenna radiator, a recess may be provided in an outer surface of the antenna radiator around the fastening hole, and the first fixing portion may include a protrusion seated in the recess.

The tension structure may include at least one tension rib disposed on the protrusion and extending outward from the protrusion to elastically contact an inner wall of the recess.

The at least one tension rib may be disposed on the first surface and is at least partially bent in a direction in which the second surface is oriented.

The at least one tension rib may extend outward from the protrusion through an opening in the protrusion.

The tension structure may include a conductive contact disposed on the plate portion or the first fixing portion, and configured to continuously provide a contact force to an inner wall of the recess.

The antenna radiator may include a unit conductive portion provided via at least one non-conductive portion in a portion of the housing.

The unit conductive portion may form a portion of an exterior of the electronic device.

The electronic device may further include a flexible substrate disposed between the electrical connection member and the substrate and electrically connected to the substrate, and the second fixing portion of the electrical connection member may be electrically connected to the flexible substrate.

The first fixing portion may be fastened to the antenna radiator in a direction parallel to the substrate.

The first fixing portion may be fastened to the antenna radiator in a direction perpendicular to the substrate.

The antenna radiator may be disposed in the housing.

According to one or more embodiments, an electrical connection member may be capable of always providing a reliable electrical connection structure through its own tension structure, thereby preventing degradation of the radiation performance of an antenna, even when the electronic device is used for a long period of time or the locking device is loosened as an external impact is applied thereto.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
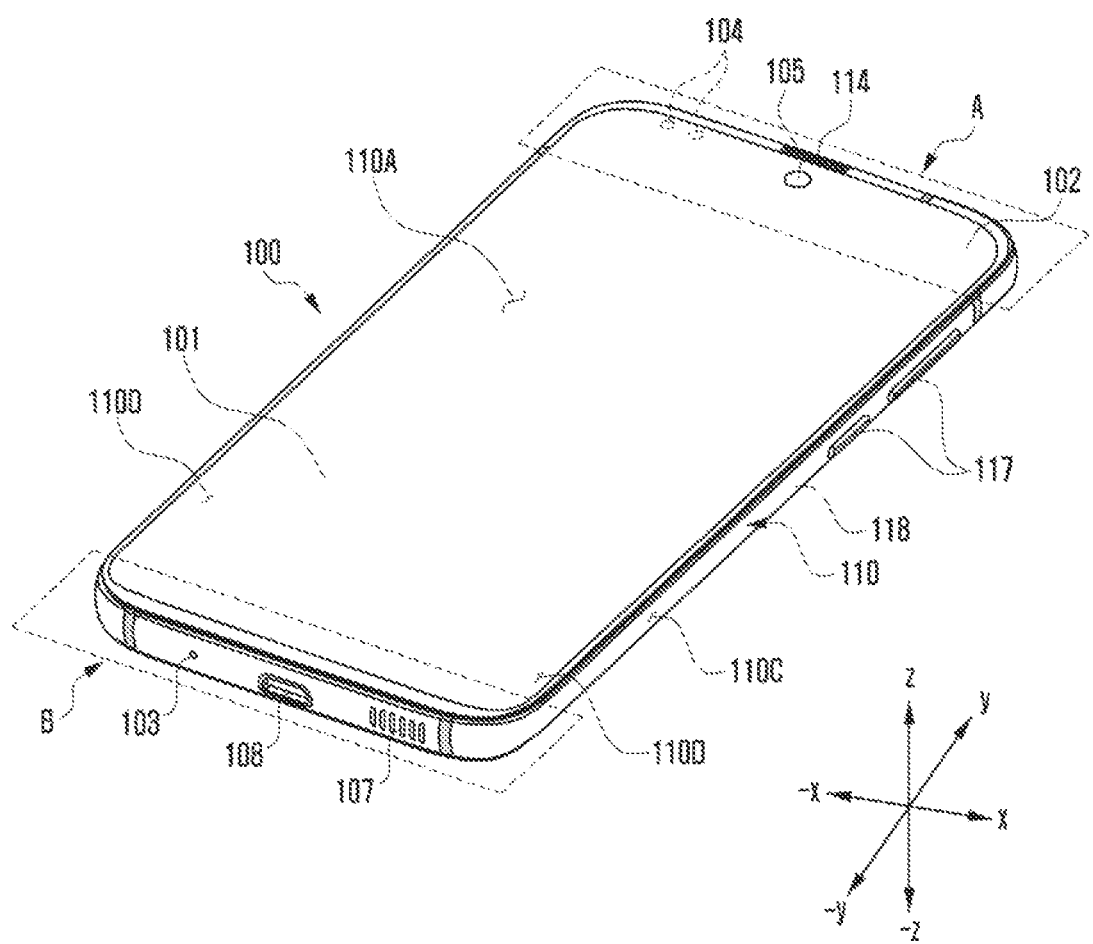
FIG. 1 is a front perspective view of an electronic device (e.g., a mobile electronic device) according to various embodiments of the disclosure.
Figure 2:
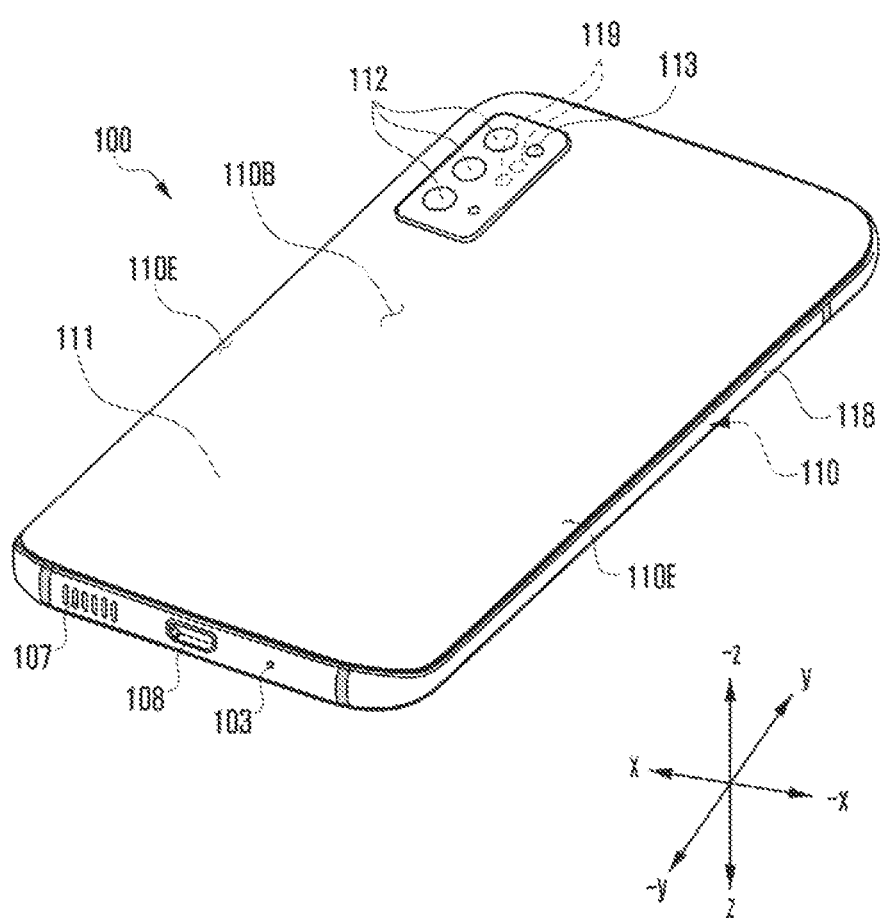
FIG. 2 is a rear perspective view of the electronic device of FIG. 1 according to various embodiments of the disclosure.

FIG. 1 illustrates a perspective view showing a front surface of a mobile electronic device according to an embodiment of the disclosure, and FIG. 2 illustrates a perspective view showing a rear surface of the mobile electronic device shown in FIG. 1 according to an embodiment of the disclosure.

Referring to FIGS. 1 and 2, a mobile electronic device 100 may include a housing 110 that includes a first surface (or front surface) 110A, a second surface (or rear surface) 110B, and a lateral surface 110C that surrounds a space between the first surface 110A and the second surface 110B. The housing 110 may refer to a structure that forms a part of the first surface 110A, the second surface 110B, and the lateral surface 110C. The first surface 110A may be formed of a front plate 102 (e.g., a glass plate or polymer plate coated with a variety of coating layers) at least a part of which is substantially transparent. The second surface 110B may be formed of a rear plate 111 which is substantially opaque. The rear plate 111 may be formed of, for example, coated or colored glass, ceramic, polymer, metal (e.g., aluminum, stainless steel (STS), or magnesium), or any combination thereof. The lateral surface 110C may be formed of a lateral bezel structure (or "lateral member") 118 which is combined with the front plate 102 and the rear plate 111 and includes a metal and/or polymer. The rear plate 111 and the lateral bezel structure 118 may be integrally formed and may be of the same material (e.g., a metallic material such as aluminum).

The front plate 102 may include two first regions 110D disposed at long edges thereof, respectively, and bent and extended seamlessly from the first surface 110A toward the rear plate 111. Similarly, the rear plate 111 may include two second regions 110E disposed at long edges thereof, respectively, and bent and extended seamlessly from the second surface 110B toward the front plate 102. The front plate 102 (or the rear plate 111) may include only one of the first regions 110D (or of the second regions 110E). The first regions 110D or the second regions 110E may be omitted in part. When viewed from a lateral side of the mobile electronic device 100, the lateral bezel structure 118 may have a first thickness (or width) on a lateral side where the first region 110D or the second region 110E is not included, and may have a second thickness, being less than the first thickness, on another lateral side where the first region 110D or the second region 110E is included.

The mobile electronic device 100 may include at least one of a display 101, audio modules 103, 107 and 114, sensor modules 104 and 119, camera modules 105, 112 and 113, a key input device 117, a light emitting device, and connector hole 108. The mobile electronic device 100 may omit at least one (e.g., the key input device 117 or the light emitting device) of the above components, or may further include other components.

The display 101 may be exposed through a substantial portion of the front plate 102, for example. At least a part of the display 101 may be exposed through the front plate 102 that forms the first surface 110A and the first region 110D of the lateral surface 110C. The display 101 may be combined with, or adjacent to, a touch sensing circuit, a pressure sensor capable of measuring the touch strength (pressure), and/or a digitizer for detecting a stylus pen. At least a part of the sensor modules 104 and 119 and/or at least a part of the key input device 117 may be disposed in the first region 110D and/or the second region 110E.

The audio modules 103, 107 and 114 may correspond to a microphone hole 103 and speaker holes 107 and 114, respectively. The microphone hole 103 may contain a microphone disposed therein for acquiring external sounds and, in a case, contain a plurality of microphones to sense a sound direction. The speaker holes 107 and 114 may be classified into an external speaker hole 107 and a call receiver hole 114. The microphone hole 103 and the speaker holes 107 and 114 may be implemented as a single hole, or a speaker (e.g., a piezo speaker) may be provided without the speaker holes 107 and 114.

The sensor modules 104 and 119 may generate electrical signals or data corresponding to an internal operating state of the mobile electronic device 100 or to an external environmental condition. The sensor modules 104 and 119 may include a first sensor module 104 (e.g., a proximity sensor) and/or a second sensor module (e.g., a fingerprint sensor) disposed on the first surface 110A of the housing 110, and/or a third sensor module 119 (e.g., a heart rate monitor (HRM) sensor) and/or a fourth sensor module (e.g., a fingerprint sensor) disposed on the second surface 110B of the housing 110. The fingerprint sensor may be disposed on the second surface 110B as well as the first surface 110A (e.g., the display 101) of the housing 110. The electronic device 100 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 105, 112 and 113 may include a first camera device 105 disposed on the first surface 110A of the electronic device 100, and a second camera device 112 and/or a flash 113 disposed on the second surface 110B. The camera module 105 or the camera module 112 may include one or more lenses, an image sensor, and/or an image signal processor. The flash 113 may include, for example, a light emitting diode or a xenon lamp. Two or more lenses (infrared cameras, wide angle and telephoto lenses) and image sensors may be disposed on one side of the electronic device 100.

The key input device 117 may be disposed on the lateral surface 110C of the housing 110. The mobile electronic device 100 may not include some or all of the key input device 117 described above, and the key input device 117 which is not included may be implemented in another form such as a soft key on the display 101. The key input device 117 may include the sensor module disposed on the second surface 110B of the housing 110.

The light emitting device may be disposed on the first surface 110A of the housing 110. For example, the light emitting device may provide status information of the electronic device 100 in an optical form. The light emitting device may provide a light source associated with the operation of the camera module 105. The light emitting device may include, for example, a light emitting diode (LED), an IR LED, or a xenon lamp.

The connector hole 108 may include a first connector hole 108 adapted for a connector (e.g., a universal serial bus (USB) connector) for transmitting and receiving power and/or data to and from an external electronic device. The connector hole 108 may include a second connector hole (not shown) adapted for a connector (e.g., an earphone jack) for transmitting and receiving an audio signal to and from an external electronic device.

Some sensor modules 105 of camera modules 105 and 212, some sensor modules 104 of sensor modules 104 and 119, or an indicator may be arranged to be exposed through a display 101. For example, the camera module 105, the sensor module 104, or the indicator may be arranged in the internal space of an electronic device 100 so as to be brought into contact with an external environment through an opening of the display 101, which is perforated up to a front plate 102. In another embodiment, some sensor modules 104 may be arranged to perform their functions without being visually exposed through the front plate 102 in the internal space of the electronic device. For example, in this case, an area of the display 101 facing the sensor module may not require a perforated opening.

According to various embodiments, the electronic device 100 may include at least one antenna radiator (e.g., the first conductive portion 4211 of FIG. 4) configured via at least a portion of the conductive side surface member 118. According to an embodiment, at least one antenna radiator (e.g., the first conductive portion 4211 of FIG. 4) may be disposed on an upper area (e.g., area A) and/or a lower area (e.g., area B)

of the electronic device 100. At least one antenna radiator (e.g., the first conductive portion 4211 of FIG. 4) according to exemplary embodiments of the disclosure may be configured to operate in at least one frequency band via at least one electrical connection member (e.g., the electrical connection member 500 of FIG. 6A) disposed inside the electronic device 100.

Figure 3:
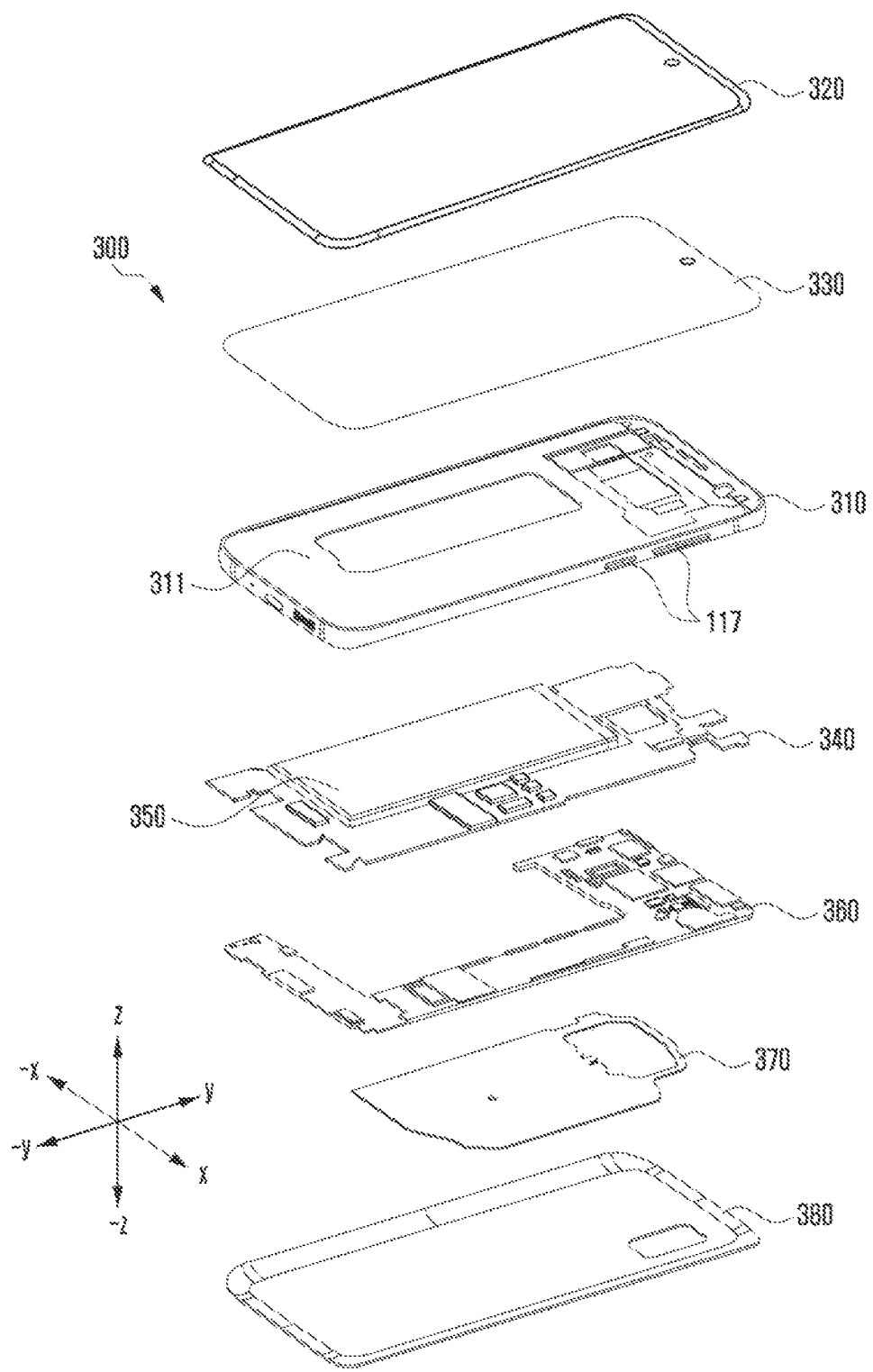
FIG. 3 is an exploded perspective view of the electronic device of FIG. 1 according to various embodiments of the disclosure.

FIG. 3 illustrates an exploded perspective view showing a mobile electronic device shown in FIG. 1 according to an embodiment of the disclosure.

The electronic device 300 in FIG. 3 may be at least partially similar to the electronic device 100 in FIG. 1 and FIG. 2 or may further include other embodiments.

Referring to FIG. 3, a mobile electronic device 300 may include a lateral bezel structure 310, a first support member 311 (e.g., a bracket), a front plate 320, a display 330, an electromagnetic induction panel, a printed circuit board (PCB) 340, a battery 350, a second support member 360 (e.g., a rear case), an antenna 370, and a rear plate 380. The mobile electronic device 300 may omit at least one (e.g., the first support member 311 or the second support member 360) of the above components or may further include another component. Some components of the electronic device 300 may be the same as or similar to those of the mobile electronic device 100 shown in FIG. 1 or FIG. 2, thus, descriptions thereof are omitted below.

The first support member 311 is disposed inside the mobile electronic device 300 and may be connected to, or integrated with, the lateral bezel structure 310. The first support member 311 may be formed of, for example, a metallic material and/or a non-metal (e.g., polymer) material. The first support member 311 may be combined with the display 330 at one side thereof and also combined with the printed circuit board (PCB) 340 at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, one or more of a volatile memory and a non-volatile memory.

The interface may include, for example, a high definition multimedia interface (HDMI), a USB interface, a secure digital (SD) card interface, and/or an audio interface. The interface may electrically or physically connect the mobile electronic device 300 with an external electronic device and may include a USB connector, an SD card/multimedia card (MMC) connector, or an audio connector.

The battery 350 is a device for supplying power to at least one component of the mobile electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the mobile electronic device 300, and may be detachably disposed from the mobile electronic device 300.

The antenna 370 may be disposed between the rear plate 380 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 310 and/or the first support member 311.

Figure 4:
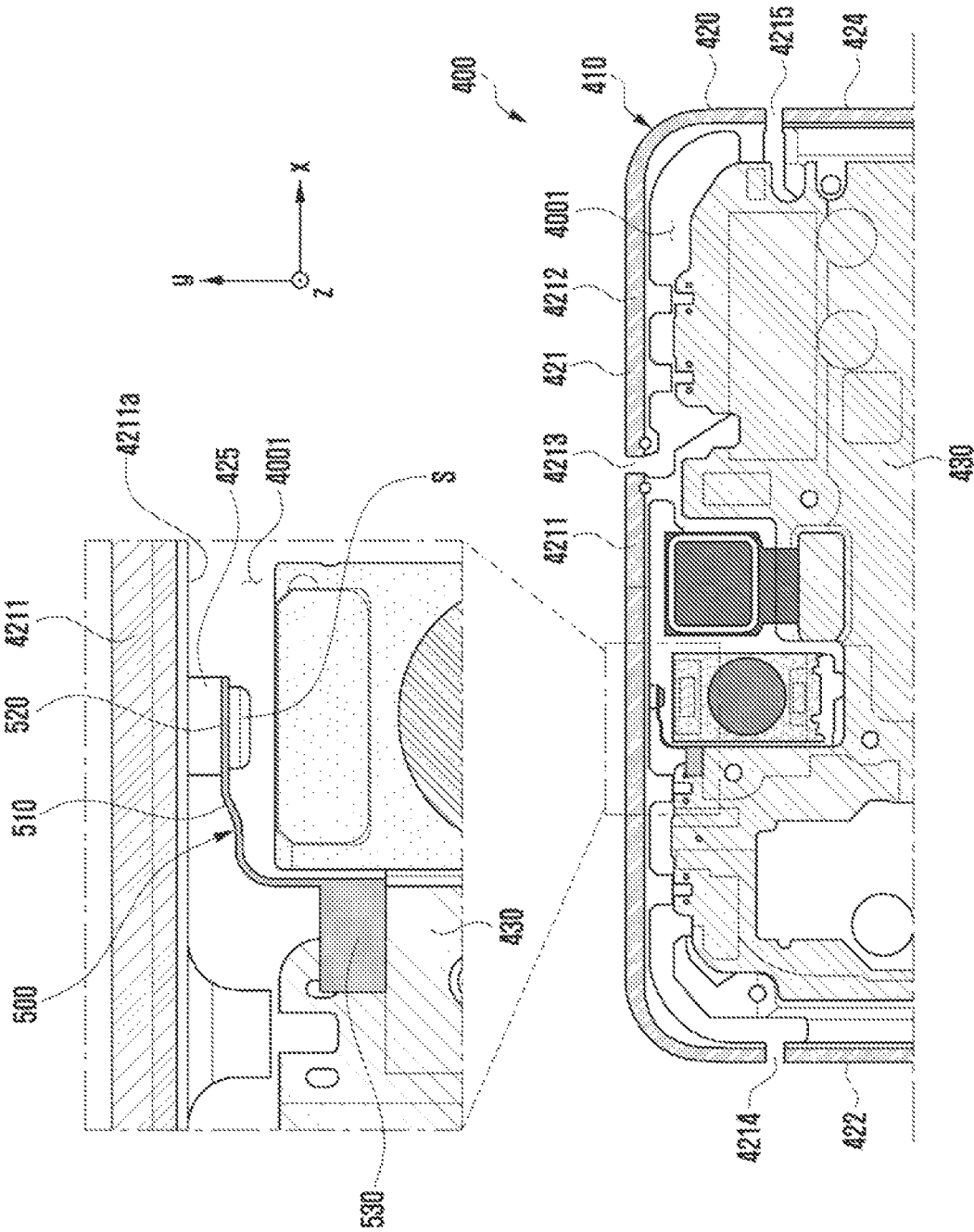
FIG. 4 is a partial configuration view of an electronic device according to various embodiments of the disclosure.

FIG. 4 is a partial configuration view of an electronic device 400 according to various embodiments of the disclosure.

The electronic device 400 of FIG. 4 may be at least partially similar to the electronic device 100 of FIGS. 1 and/or the electronic device 300 of FIG. 3, or may include other embodiments of the same.

Referring to FIG. 4, the electronic device 400 (e.g., the electronic device 100 of FIG. 1 and/or the electronic device 300 of FIG. 3) may include a housing 410 (e.g., the housing 110 of FIG. 1) (e.g., a housing structure) that includes a front surface cover (e.g., the front surface plate 102 of FIG. 1) (e.g., the first cover or first plate), a rear surface cover facing away from the front surface cover (e.g., the rear surface plate 111 of FIG. 2) (e.g., the second cover or second plate), and a side surface member 420 (e.g., the side surface member 118 of FIG. 1) surrounding the inner space 4001 between the front surface cover and the rear surface cover. According to an embodiment, the side surface member 420 may be at least partially made of a conductive member.

According to various embodiments, the side surface member 420 may include a first side surface 421 having a first length, a second side surface 422 extending in a vertical direction from the first side surface 421 and having a second length longer than the first length, a third side surface extending in a direction parallel to the first side surface 421 from the second side surface 422 and having the first length, and a fourth side surface 424 extending from the third side surface in a direction parallel to the second side surface 422 and having the second length.

According to various embodiments, the side surface member 420 made of a conductive material (e.g., metal) may include one or more conductive portions 4211 and 4212 electrically disconnected by one or more non-conductive portions 4213, 4214, and 4215. According to an embodiment, the electronic device 400 may include two unit conductive portions 4211 and 4212 disposed via three non-conductive portions 4213, 4214, and 4215 in an upper area (e.g., area A of FIG. 1). For example, the electronic device 400 may include a first conductive portion 4211 disposed through a first non-conductive portion 4213 provided in at least a portion of the first side surface 421 and a second non-conductive portion 4214 provided in at least a portion of the second side surface 422. According to an embodiment, the electronic device 400 may include a second conductive portion 4212 disposed adjacent to the first conductive portion 4211 via the first non-conductive portion 4213 and a third non-conductive portion 4215 provided in at least a portion of the fourth side surface 424. In some embodiments, the electronic device 400 may include one or more conductive portions disposed in a substantially similar manner in a lower area (e.g., area B of FIG. 1) of the side surface member 420 as well.

According to various embodiments, the electronic device 400 may include a substrate 430 (e.g., a printed circuit board, a device board, or a main board) disposed in the inner space 4001. According to an embodiment, the substrate 430 may include at least one wireless communication circuit (e.g., a feeder). According to an embodiment, the substrate 430 may be electrically connected to the first conductive portion 4211 via an electrical connection member 500 according to exemplary embodiments of the disclosure. For example, the wireless communication circuit disposed on the substrate 430 may be configured to transmit and/or receive a wireless signal in at least one predetermined frequency band by using the first conductive portion 4211 electromagnetically connected thereto via the electrical connection member 500 as an antenna radiator. In some embodiments, the substrate 430 may be electrically connected to at least a portion of the second conductive portion 4212 via another electrical connection member. In this case, the wireless communication circuit may be configured to transmit and/or receive a wireless signal by using the second conductive portion 4212 as another antenna radiator.

According to various embodiments, the electrical connection member 500 may electrically interconnect the first conductive portion 4211 and the substrate 430 spaced apart from the same by a predetermined distance in the inner space 4001 of the electronic device 400. For example, the predetermined distance may include a distance in which the substrate 430 and the first conductive portion 4211 are not electrically connectable via a conductive contact (e.g., a C-clip or conductive tape). According to an embodiment, the electrical connection member 500 is a metal plate and may be configured in various shapes to easily interconnect the first conductive portion 4211 and the substrate 430. According to an embodiment, the electrical connection member 500 may include a plate portion 510 having a length, a first fixing portion 520 provided at one end of the plate portion 510 and including a through hole (e.g., the through hole 521 of FIG. 6A) through which at least a portion of a locking device S (e.g., a screw or fastening member) passes, and a second fixing portion 530 provided at the other end of the plate portion 510 and fixed to the substrate 430. According to an embodiment, the first fixing portion 520 may pass through the through hole 521 and may be fixed to the first conductive portion 4211 via the locking device S fastened to the inner surface 4211a of the first conductive portion 4211. According to an embodiment, the second fixing portion 530 may be fixed to a corresponding conductive pad of the substrate 430 via a fixing structure such as soldering. In some embodiments, the second fixing portion 530 may be electrically connected to the substrate 430 through conductive bonding or structural coupling. In some embodiments, the second fixing portion 530 may be electrically connected to the substrate 430 via a conductive contact (e.g., a C-clip or conductive tape).

According to an exemplary embodiment of the disclosure, the electrical connection member 500 may include a tension structure. For example, even when the electronic device 400 is used for a long period of time or the locking device S is loosened or partially released due to an external impact, the electrical connection member 500 is able to maintain a reliable electrical connection (e.g., physical contact) between the first fixing portion 520 and the first conductive portion 4211 via the tension structure, thereby preventing deterioration in radiation performance of the first conductive portion 4211 due to the loosening of the locking device.

In some embodiments, the first conductive portion 4211 may be replaced with another antenna structure (e.g., an antenna carrier or an antenna structure disposed on another substrate) spaced apart from the substrate in the inner space of the electronic device.

Figure 5A:
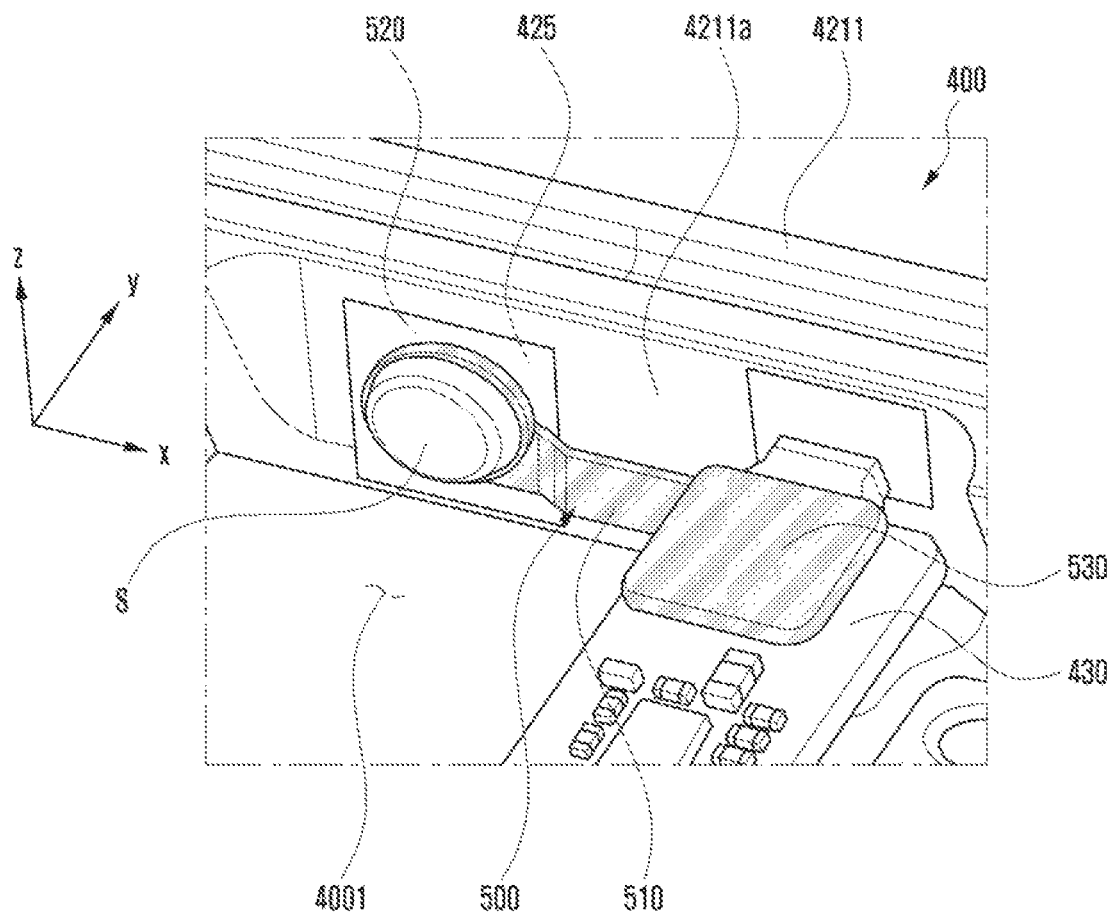
FIGS. 5A and 5B are partial perspective views illustrating a state in which a conductive portion is electrically connected to a substrate via an electrical connection member according to various embodiments of the disclosure.
Figure 5B:
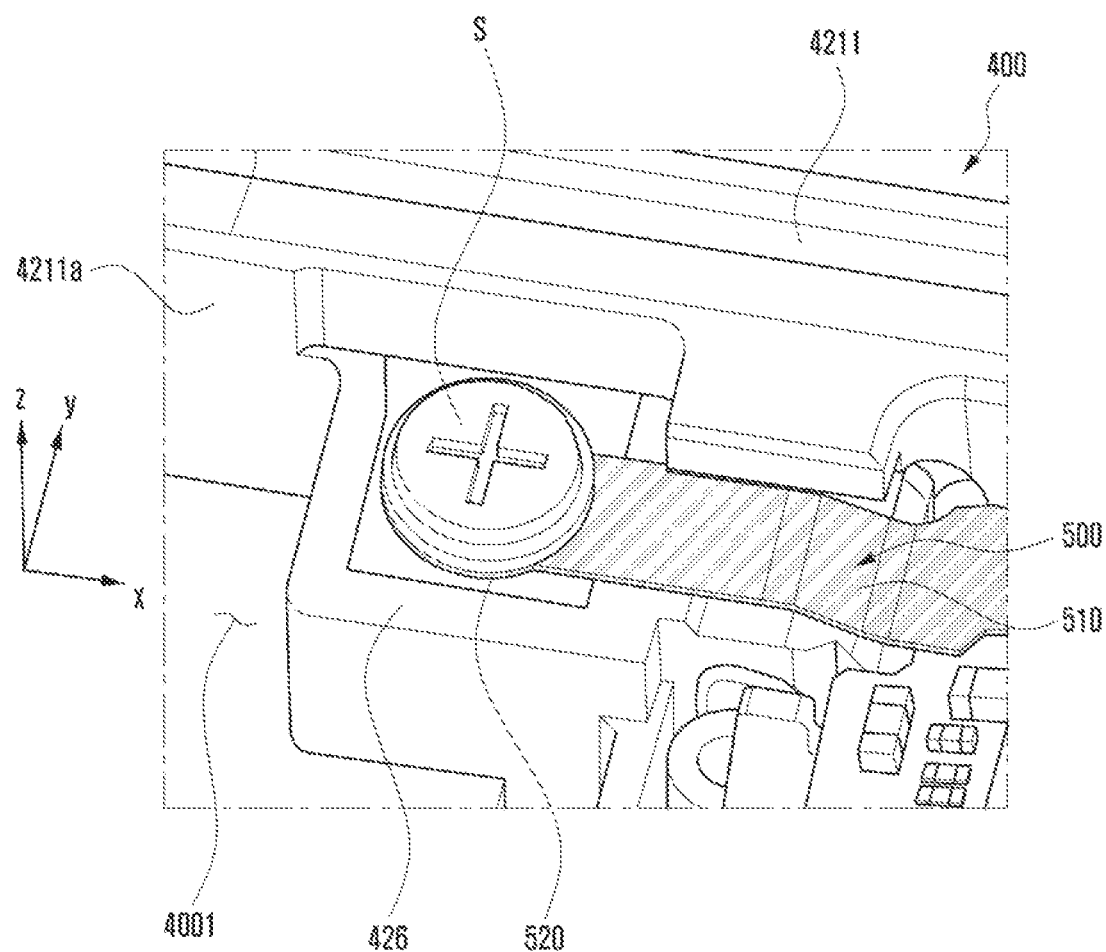

FIGS. 5A and 5B are partial perspective views illustrating a state in which a conductive portion is electrically connected to a substrate via an electrical connection member according to various embodiments of the disclosure.

Referring to FIG. 5A, the electronic device 400 may include an electrical connection member 500 disposed in an inner space 4001 of the electronic device 400 and electrically interconnecting a first conductive portion 4211 used as an antenna radiator and a substrate 430. According to an embodiment, the second fixing portion 520 of the electrical connection member 500 may be assembled to come into surface contact with the inner surface 4211a of the first conductive portion 4211 in a locking device fastening part 425. In this case, the locking device S may be fastened in a direction perpendicular to the inner surface of the first conductive portion 4211 (e.g., the y-axis direction).

Referring to FIG. 5B, in the inner space 4001 of the electronic device 400, the second fixing portion 520 of the electrical connection member 500 may be fixed to a locking device fastening portion 426 extending from a portion of the first conductive portion 4211 to the inner space. For example, the second fixing portion 520 may be assembled in a direction perpendicular to the inner surface 4211a of the first conductive portion 4211 (e.g., the z-axis direction). In this case, the locking device S may be fastened to the locking device fastening portion 426 in a direction parallel to the inner surface 4211a of the first conductive portion 4211.

Hereinafter, various embodiments of the electrical connection member 500 and the tension structure applied thereto will be described in detail, and the first conductive portion 4211 may be referred to as a "conductive portion."

Figure 6A:
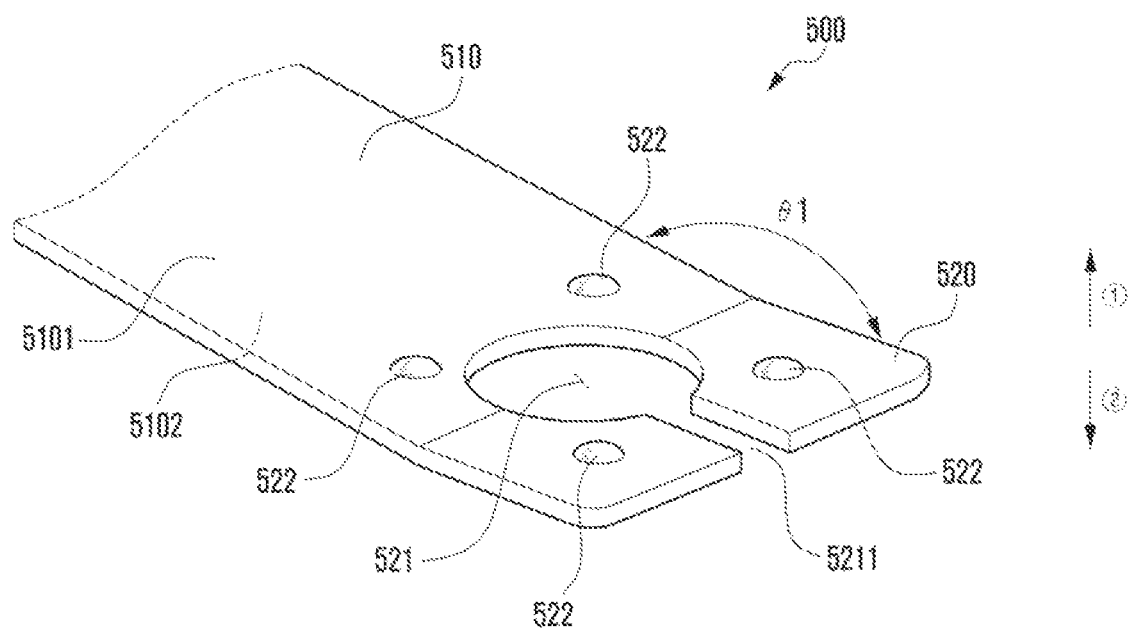
FIG. 6A is a partial perspective view of an electrical connection member according to various embodiments of the disclosure.
Figure 6B:
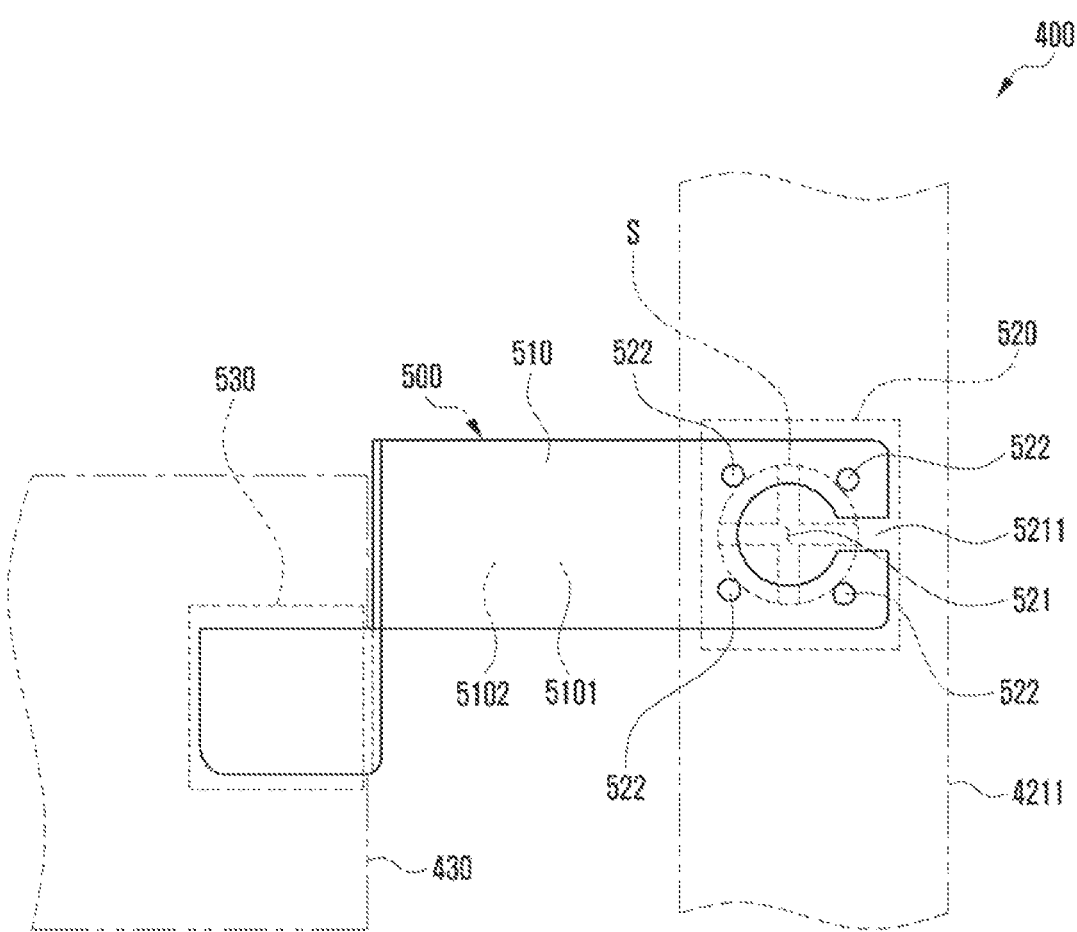
FIG. 6B is a plan view illustrating a state in which an electrical connection member according to various embodiments of the disclosure is fixed to a substrate and a conductive portion.

FIG. 6A is a partial perspective view of the electrical connection member 500 according to various embodiments of the disclosure. FIG. 6B is a view illustrating a state in which the electrical connection member 500 is fixed to a substrate 430 and the conductive portion 4211 according to various embodiments of the disclosure.

Referring to FIGS. 6A and 6B, an electronic device 400 may include a substrate 430 disposed in the inner space of the electronic device, a conductive portion 4211 spaced apart from the substrate 430, and an electrical connection member 500 that electrically interconnects the conductive portion 4211 and the substrate 430. According to an embodiment, the electrical connection member 500 may include a plate portion 510, a first fixing portion 520 provided at one end of the plate portion 510 and fixed to the conductive portion 4211 by a locking device S, and a second fixing portion 530 provided at the other end of the plate portion 510 and fixed to the substrate 430. According to an embodiment, the first fixing portion 520 may include a through hole 521 through which the locking device S passes. According to an embodiment, the electrical connection member 500 may include a first surface 5101 oriented in a first direction (direction ①) (e.g., the direction toward the conductive portion) and a second surface 5102 oriented in a second direction (direction ②) opposite to the first direction (direction ①). According to an embodiment, in the first fixing portion 520, an end portion including at least a portion of the through hole 521 may be bent with respect to the plate portion 510 in the first direction (direction ①) by a predetermined angle θ1. According to an embodiment, the electrical connection member 500 may include at least one tension protrusion 522 protruding from the first surface 5101 in the periphery of the through hole 521 of the first fixing portion 520. According to an embodiment, the electrical connection member 500 may include at least one tension slit 5211 provided to be connected to the through hole 521 from at least a portion of an end of the first fixing portion 520. According to an embodiment, when the first fixing portion 520 is fastened to the conductive portion by the locking device S via an end of the first fixing portion 520 bent in the first direction (direction ①) and at least one tension protrusion 522, the first fixing portion 520 has its own tension and may come into contact with the conductive portion 4211 by the fastening force of the locking device S. According to an embodiment, the at least one tension slit 5211 may assist elastic deformation through at least one divided portion of the first fixing portion 520.

Figure 7A:
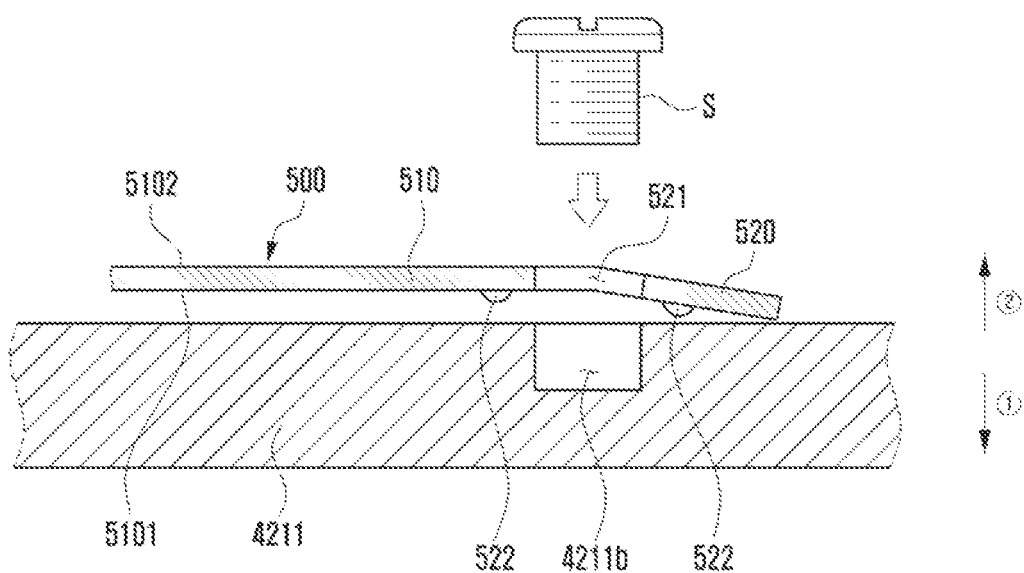
FIG. 7A is a cross-sectional view illustrating a state before the electrical connection member of FIG. 6B according to various embodiments of the disclosure is fastened to the conductive portion.
Figure 7B:
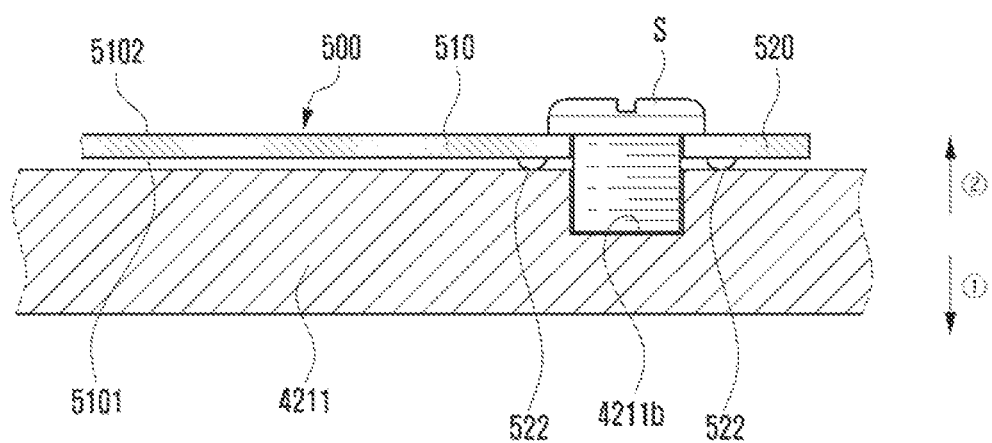
FIG. 7B is a cross-sectional view illustrating a state in which the electrical connection member of FIG. 6B according to various embodiments of the disclosure is fastened to the conductive portion.
Figure 7C:
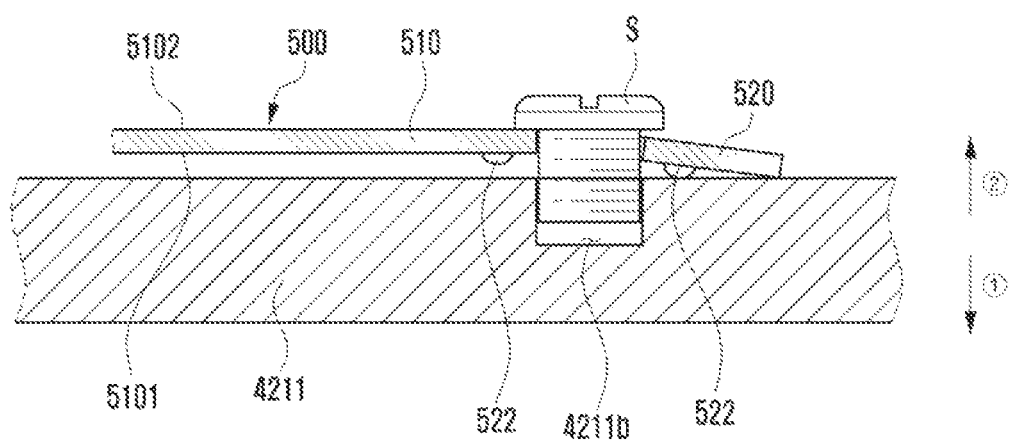
FIG. 7C is a cross-sectional view illustrating a contact relationship between an electrical connection member and a conductive portion according to releasing of a locking device according to various embodiments of the disclosure.

FIG. 7A is a view illustrating a state before the electrical connection member 500 of FIG. 6B according to various embodiments of the disclosure is coupled to the conductive portion 4211. FIG. 7B is a view illustrating a state in which the electrical connection member 500 of FIG. 6B according to various embodiments of the disclosure is fastened to the conductive portion 4211. FIG. 7C is a view illustrating a contact relationship between the electrical connection member 500 of FIG. 6B and the conductive portion 4211 according to the releasing of the locking device S according to various embodiments of the disclosure.

Referring to FIG. 7A, when the electrical connection member 500 is placed on the conductive portion 4211, only the end portion of the partially bent first fixing portion 520 including the through hole 521 may come into contact with the conductive portion 4211. In this case, the through hole 521 of the first fixing portion 520 may remain aligned with the fastening hole 4211b of the conductive portion 4211 for fastening the locking device.

Referring to FIG. 7B, the electrical connection member 500 may be fixed to the conductive portion 4211 by the locking device S, which passes through the through hole 521 of the first fixing portion 520 and is then fastened to the fastening hole 4211b of the conductive portion 4211. In this case, the first fixing portion 520 may be elastically deformed to be parallel to the plate portion 510 by the fastening force of the locking device S, so that at least one tension protrusion 522 may remain in contact with the conductive portion 4211. In some embodiments, when the tension protrusion 522 is not present, the plate portion 510 and the first fixing portion 520 may brought into contact with the conductive portion 4211 as a whole by the fastening force of the locking device.

Referring to FIG. 7C, when an electronic device (e.g., the electronic device 400 of FIG. 4) is subjected to an external impact, and the locking device S is partially released thereby, the electrical connection member 500 may be spaced apart from the conductive portion 4211 in the second direction (direction ②). In this case, the elastically deformed first fixing portion 520 of the electrical connection member 500 may be continuously maintained in contact with the conductive portion 4211 by a force applied by the end portion in the first direction (direction ②). Therefore, even if the locking device S is partially released, since the continuous physical contact between the electrical connection member 500 and the conductive portion 4211 is maintained, it is possible to prevent degradation of the radiation performance of the conductive portion 4211 used as an antenna radiator.

Figure 8A:
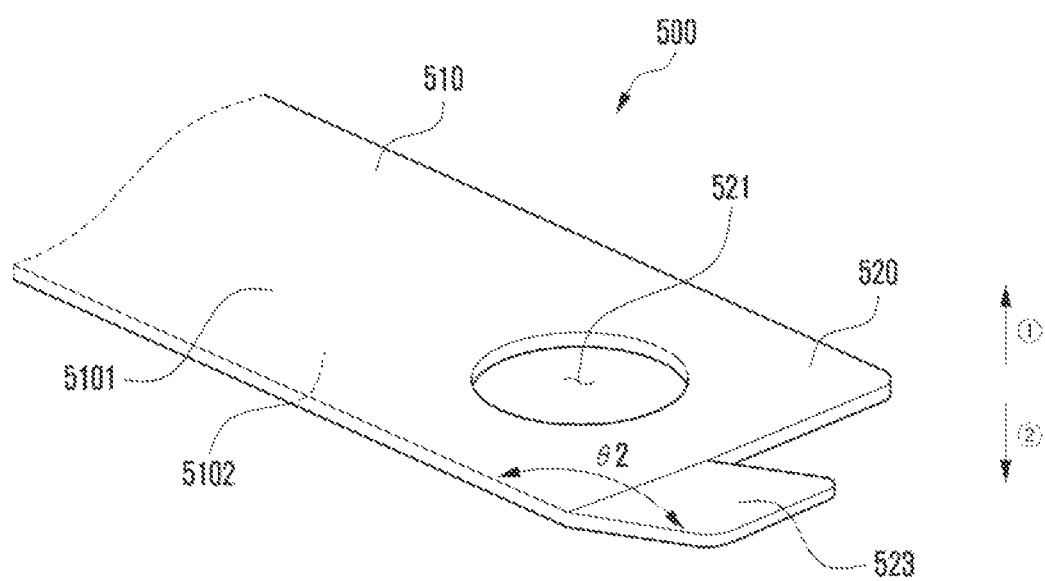
FIG. 8A is a partial perspective view of the electrical connection member of FIG. 6B according to various embodiments of the disclosure.
Figure 8B:
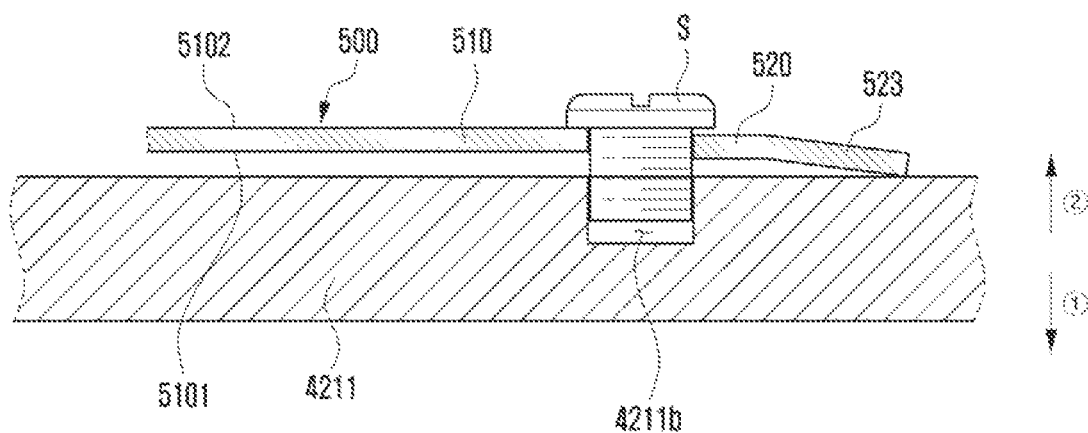
FIG. 8B is a cross-sectional view illustrating a contact relationship between an electrical connection member and a conductive portion according to releasing of a locking device according to various embodiments of the disclosure.

FIG. 8A is a partial perspective view of an electrical connection member 500 according to various embodiments of the disclosure. FIG. 8B is a view illustrating a contact relationship between the electrical connection member 500 and the conductive portion 4211 according to the releasing of the locking device S according to various embodiments of the disclosure.

Referring to FIG. 8A, the electrical connection member 500 may include at least one tension rib 523 extending outward from the first fixing portion 520. According to an embodiment, the tension rib 523 may be bent from the end of the first fixing portion 520 in the first direction (direction ①) by a predetermined angle θ2. According to an embodiment, two or more tension ribs 523, which are spaced apart from each other at the end of the first fixing portion 520 by a predetermined distance, may be provided.

Referring to FIG. 8B, when an electronic device (e.g., the electronic device 400 of FIG. 4) is subjected to an external impact, and the locking device S is partially released thereby, the electrical connection member 500 may be spaced apart from the conductive portion 4211 in the second direction (direction ②). In this case, even if the plate portion 510 and the first fixing portion 520 are spaced apart from the conductive portion 4211, the elastically deformed tension rib 523 of the electrical connection member 500 may be continuously maintained in contact with the conductive portion 4211 by the force applied by the tension rib 523 in the first direction (direction ①). Therefore, even if the locking device S is partially released, since the continuous physical contact between the electrical connection member 500 and the conductive portion 4211 is maintained by the tension rib 523, it is possible to prevent degradation of the radiation performance of the conductive portion 4211 used as an antenna radiator.

Figure 9A:
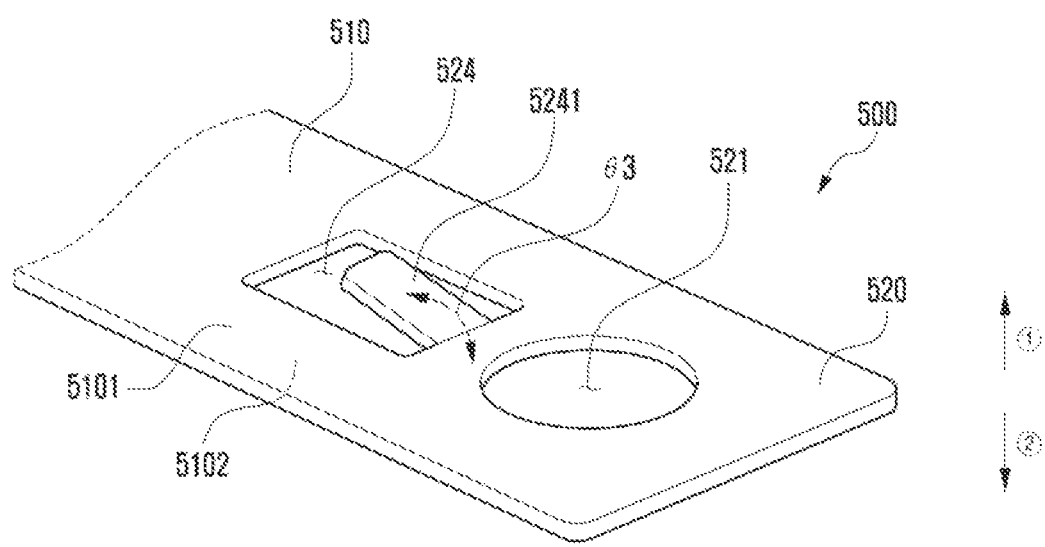
FIG. 9A is a partial perspective view of an electrical connection member according to various embodiments of the disclosure.
Figure 9B:
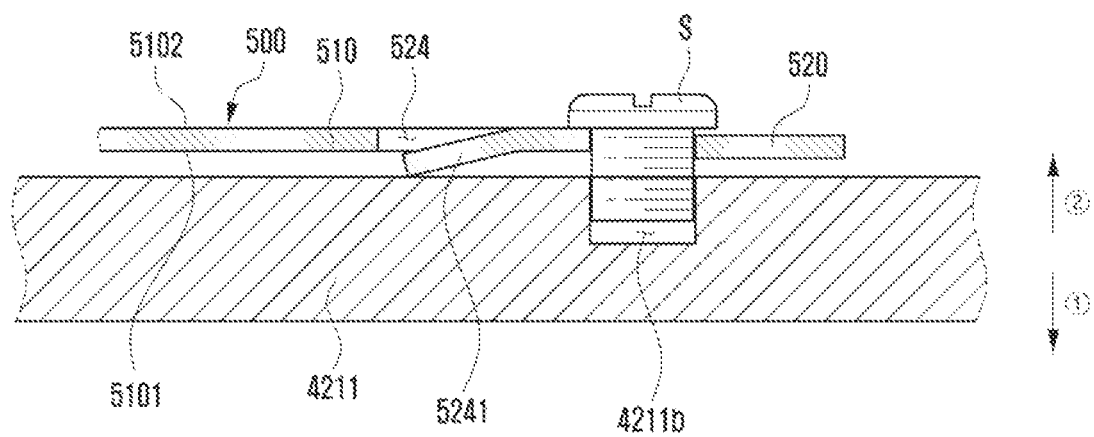
FIG. 9B is a cross-sectional view illustrating a contact relationship between an electrical connection member and a conductive portion according to releasing of a locking device according to various embodiments of the disclosure.

FIG. 9A is a partial perspective view of an electrical connection member 500 according to various embodiments of the disclosure. FIG. 9B is a view illustrating a contact relationship between the electrical connection member 500 and the conductive portion 4211 according to the releasing of the locking device S according to various embodiments of the disclosure.

Referring to FIG. 9A, the electrical connection member 500 may include an opening 524 provided in at least a partial area of the plate portion 510 and/or the first fixing portion 520 in the periphery of the through hole 521, and at least one tension rib 5241 extending into the opening 524. According to an embodiment, the tension rib 5241 may be bent from a portion at which the opening 524 of the first fixing portion 520 is initiated in the first direction (direction ①) by a predetermined angle θ3. According to an embodiment, two or more tension ribs 5241, which extend into the opening 524 and are spaced apart from each other by a predetermined distance, may be provided.

Referring to FIG. 9B, when an electronic device (e.g., the electronic device 400 of FIG. 4) is subjected to an external impact, and the locking device S is partially released thereby, the electrical connection member 500 may be spaced apart from the conductive portion 4211 in the second direction (direction ②). In this case, even if the plate portion 510 and the first fixing portion 520 are spaced apart from the conductive portion 4211, the elastically deformed tension rib 5241 of the electrical connection member 500 may be continuously maintained in contact with the conductive portion 4211 by the force applied by the tension rib 523 in the first direction (direction ①). Therefore, even if the locking device S is partially released, since the continuous physical contact between the electrical connection member 500 and the conductive portion 4211 is maintained by the tension rib 5241, it is possible to prevent degradation of the radiation performance of the conductive portion 4211 used as an antenna radiator.

Figure 10A:
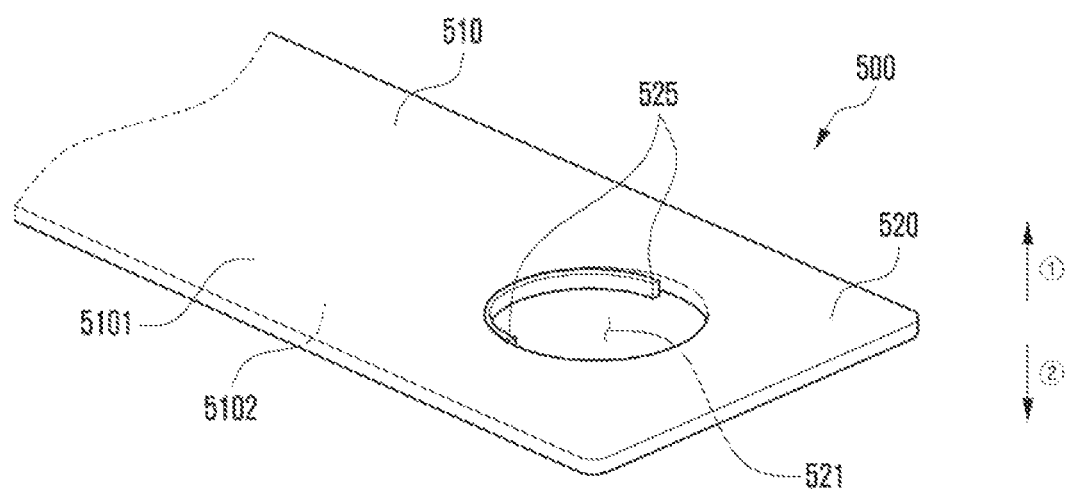
FIG. 10A is a partial perspective view of an electrical connection member according to various embodiments of the disclosure.
Figure 10B:
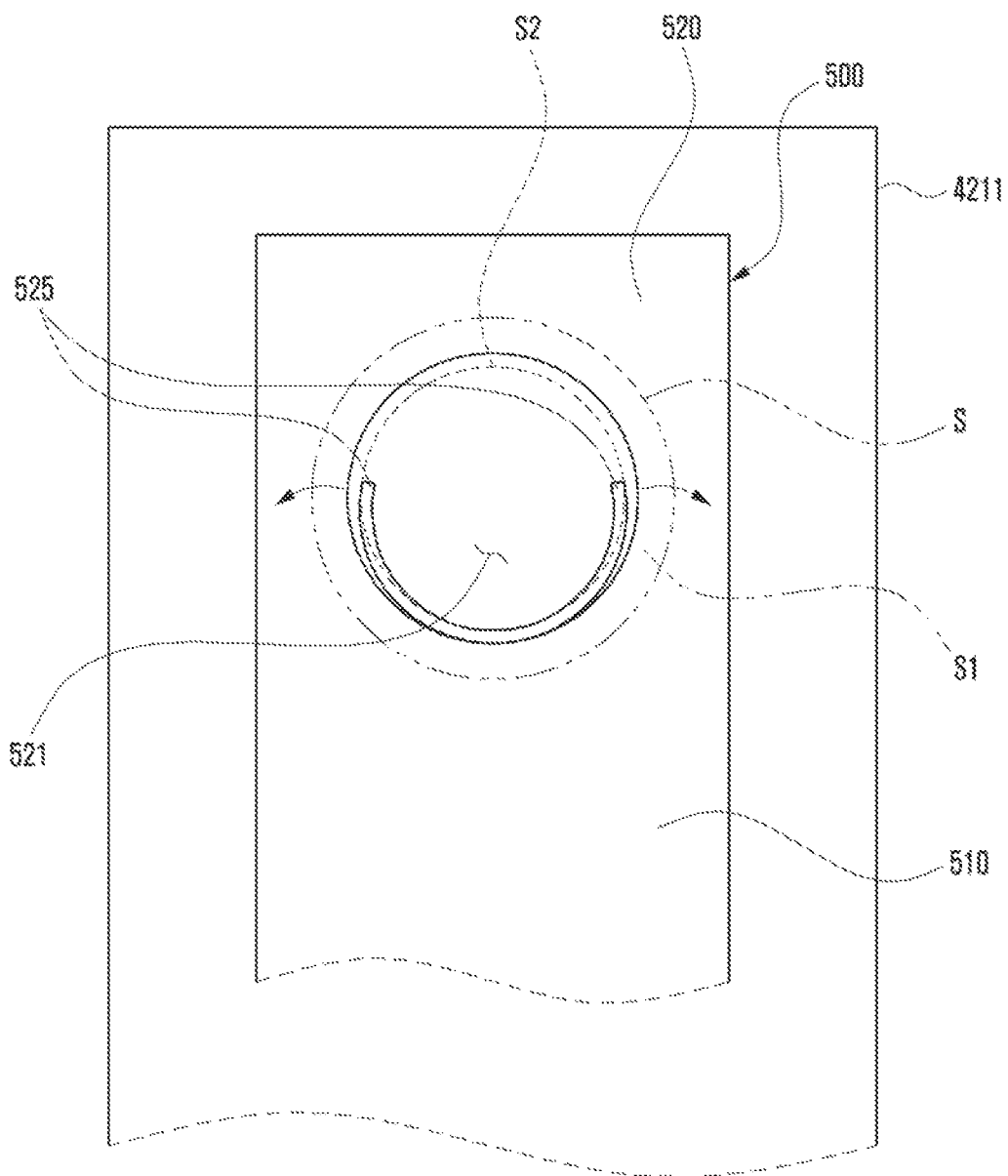
FIG. 10B is a partial plan view illustrating a state in which a locking device is fastened to an electrical connection member according to various embodiments of the disclosure.

FIG. 10A is a partial perspective view of an electrical connection member 500 according to various embodiments of the disclosure. FIG. 10B is a view illustrating a state in which a locking device S is fastened to the electrical connection member 500 according to various embodiments of the disclosure.

Referring to FIG. 10A, the electrical connection member 500 may include at least one tension rib 525 extending into at least a partial space of a through hole 521. According to an embodiment, the at least one tension rib 525 may be provided in a curved shape extending from the through hole 521 in a direction parallel to a first surface 5101 and having a curvature smaller than that of the inner diameter of the through hole 521. According to an embodiment, the tension rib 525 may be configured integrally with the first fixing portion 520 or fixed inside the through hole 521. In some embodiments, the tension rib 525 may protrude in a direction in which the first surface 5101 is oriented (e.g., direction ①).

Referring to FIG. 10B, when a threaded portion S2 of a locking device S passes through the through hole 521, the curved tension rib 525 may be elastically deformed while being spread in the left and right directions (in the directions indicated by the arrows), and may maintain physical contact with the outer circumferential surface of the threaded portion S2 while retaining an elastic restoring force. In this case, even if the electronic device (e.g., the electronic device 400 of FIG. 4) is subjected to an external impact, and the locking device S is partially released thereby, the tension rib 525 is continuously in contact with the threaded portion S2 of the locking device S, and the threaded portion S2 may maintain the electrically connected state with the conductive portion 4211 via the fastening hole 4211b. Thus, it is possible to prevent degradation in the radiation performance of the conductive portion 4211 used as an antenna radiator. The configuration of the tension rib 525 may be advantageous for use of a locking device in which the diameter of the threaded portion S2 gradually increases toward the head S1.

Figure 11:
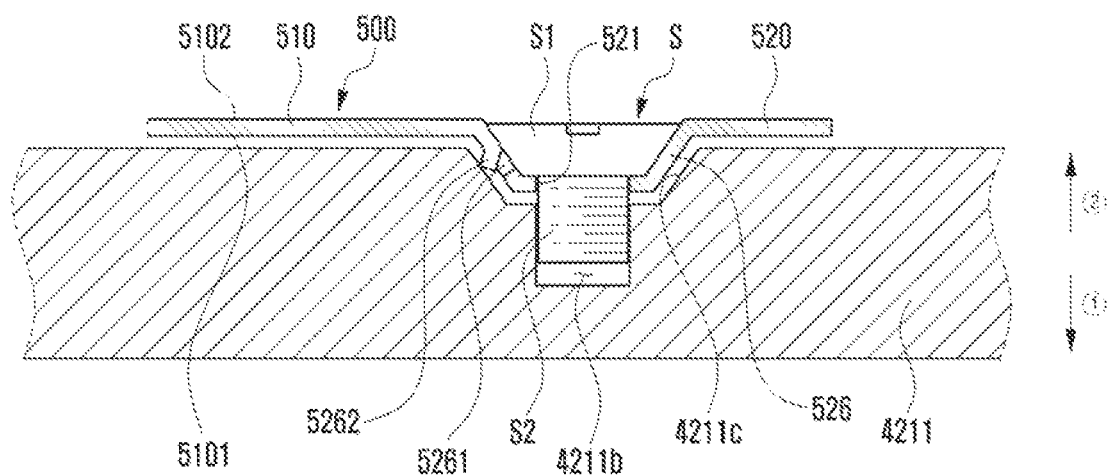
FIG. 11 is a cross-sectional view illustrating a contact relationship between an electrical connection member and a conductive portion according to releasing of a locking device according to various embodiments of the disclosure.

FIG. 11 is a view illustrating a contact relationship between the electrical connection member 500 and the conductive portion 4211 according to the releasing of the locking device S according to various embodiments of the disclosure.

Referring to FIG. 11, at least a portion of the first fixing portion 520 of the electrical connection member 500 and the conductive portion 4211 corresponding thereto may include a seating structure. According to an embodiment, in the conductive portion 4211, the seating structure may include a fastening hole 4211b and a recess 4211c lower than the outer surface of the conductive portion 4211. According to an embodiment, the seating structure may include a protrusion 526 which protrudes in a first direction (direction ①) in which the first surface 5101 is oriented in the first fixing portion 520 and is seated in the recess 4211c of the conductive portion 4211. According to an embodiment, the protrusion 526 may include a through hole 521 through which a locking device S passes. According to an embodiment, with the configuration of the protrusion 526, the first fixing portion 520 may accommodate the locking device S having a countersunk head S1 and a threaded portion S2 extending from the same. Therefore, when the locking device S passes through the electrical connection member 500 and is fastened to the fastening hole 4211b of the conductive portion 4211, the head S1 may be disposed not to be higher than the second surface 5102.

According to various embodiments, the electrical connection member 500 may include at least one tension rib 5262 protruding from the protrusion 526 in the first direction. According to an embodiment, the tension rib 5262 may protrude from the opening 5261 provided in at least a portion of the protrusion 526 in the first direction in which the first surface is oriented (direction ①). According to an embodiment, when the protrusion 526 is seated in the recess 4211c of the conductive portion 4211 and is then fastened by the locking device S, the tension rib 5262 may retain a restoring force through elastic deformation and may maintain the state of being in physical contact with the inner surface of the recess 4211c.

According to various embodiments, as illustrated, when an electronic device (e.g., the electronic device 400 of FIG. 4) is subjected to an external impact, and the locking device S is partially released thereby, the electrical connection member 500 may be spaced apart from the conductive portion 4211 in the second direction (direction ②). In this case, even if the plate portion 510 and the first fixing portion 520 are spaced apart from the conductive portion 4211, the tension rib 5262 elastically deformed from the protrusion 526 of the electrical connection member 500 may be continuously maintained in contact with the conductive portion 4211 by the force applied by the tension rib 523 in the first direction (direction ①). Therefore, even if the locking device S is partially released, since the continuous physical contact between the electrical connection member 500 and the conductive portion 4211 is maintained by the tension rib 5262, it is possible to prevent degradation of the radiation performance of the conductive portion 4211 used as an antenna radiator.

Figure 12A:
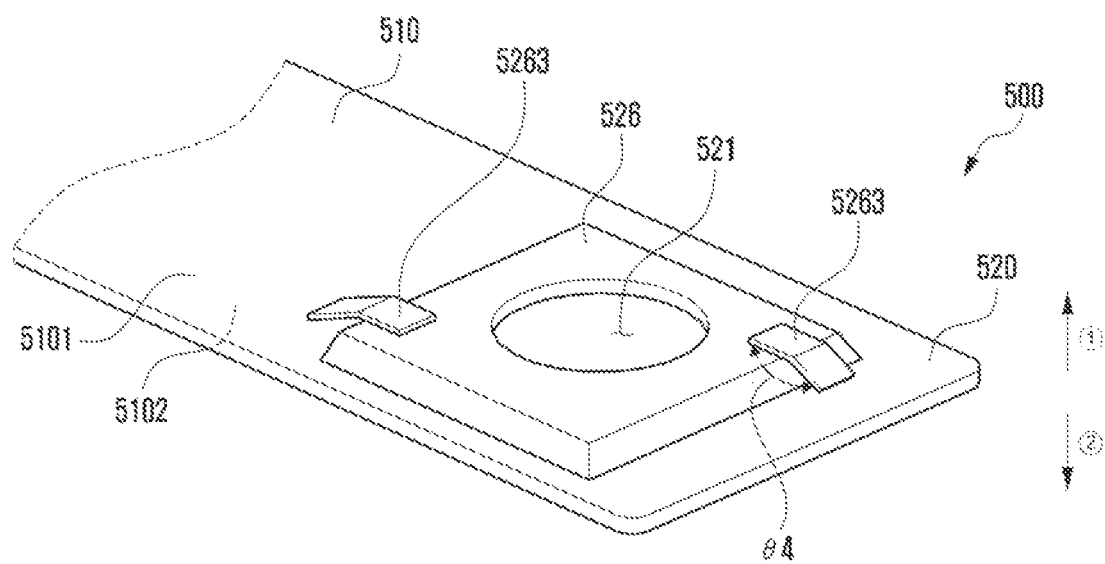
FIG. 12A is a partial perspective view of an electrical connection member according to various embodiments of the disclosure.
Figure 12B:
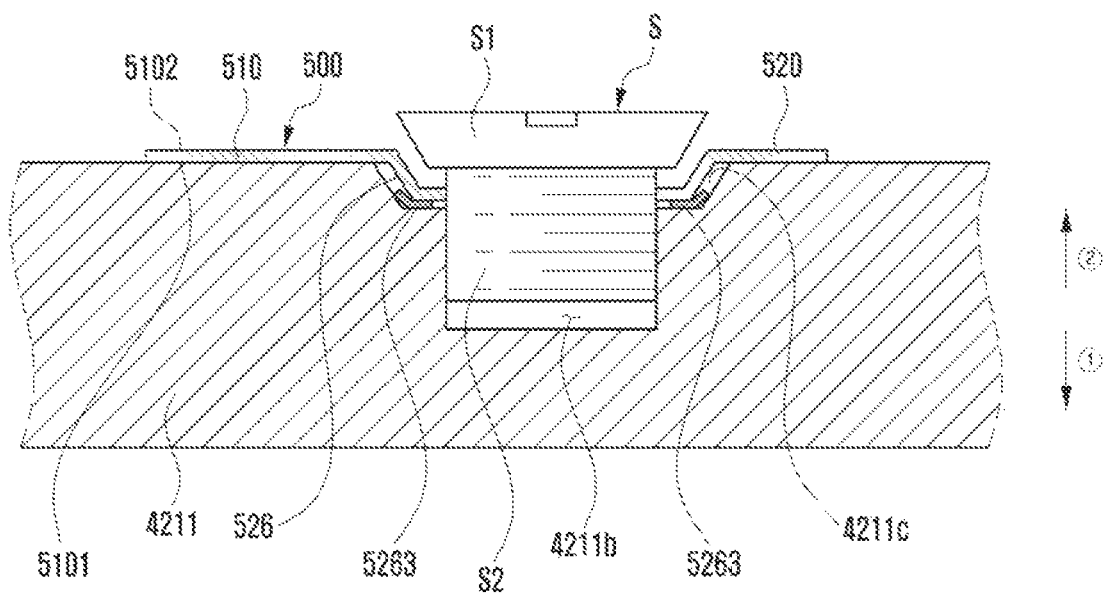
FIG. 12B is a cross-sectional view illustrating a contact relationship between an electrical connection member and a conductive portion according to releasing of a locking device according to various embodiments of the disclosure.

FIG. 12A is a partial perspective view of an electrical connection member 500 according to various embodiments of the disclosure. FIG. 12B is a view illustrating a contact relationship between the electrical connection member 500 and the conductive portion 4211 according to the releasing of the locking device S according to various embodiments of the disclosure.

Referring to FIG. 12A, the electrical connection member 500 may include at least one tension rib 5263 disposed to protrude outward from the outer surface of a protrusion 526. According to an embodiment, the at least one tension rib 5263 may be at least partially bent by a predetermined angle θ4 in a second direction in which a second surface 5102 is oriented (direction ②) (e.g., the same direction as the direction in which the locking device is released). According to an embodiment, the at least one tension rib 5263 may be attached to the outer surface of the protrusion 526 through a soldering, bonding, or welding process.

According to various embodiments, the electrical connection member 500 may be fixed to the conductive portion 4211 by a locking device S, which, after the protrusion 526 is seated in the recess 4211c of the conductive portion 4211, passes through the through hole 521 of the protrusion 526 and is fastened to the fastening hole 4211b of the conductive portion 4211. In this case, the at least one tension rib 5263 protruding from the outer surface of the protrusion 526 and bent in the second direction (direction ②) may be engaged with the inner surface of the recess 4211c to be fixed, thereby maintaining the physical contact between the electrical connection member 500 and the conductive portion 4211.

According to various embodiments, as illustrated, when an electronic device (e.g., the electronic device 400 of FIG. 4) is subjected to an external impact and the locking device S is partially released thereby, in the electrical connection member 500, only the locking device S is released and the contact structure provided by the coupling between the protrusion 526 (and/or the tension rib 5263) and the recess 4211c may be continuously maintained by the at least one tension rib 5263, which is bent in the second direction (direction ②) and comes into contact with the inner surface of the recess 4211c to be engaged with the inner surface of the recess 4211c. Therefore, even if the locking device S is partially released, since the continuous physical contact between the electrical connection member 500 and the conductive portion 4211 is maintained by the tension rib 5263, it is possible to prevent degradation of the radiation performance of the conductive portion 4211 used as an antenna radiator.

Figure 13A:
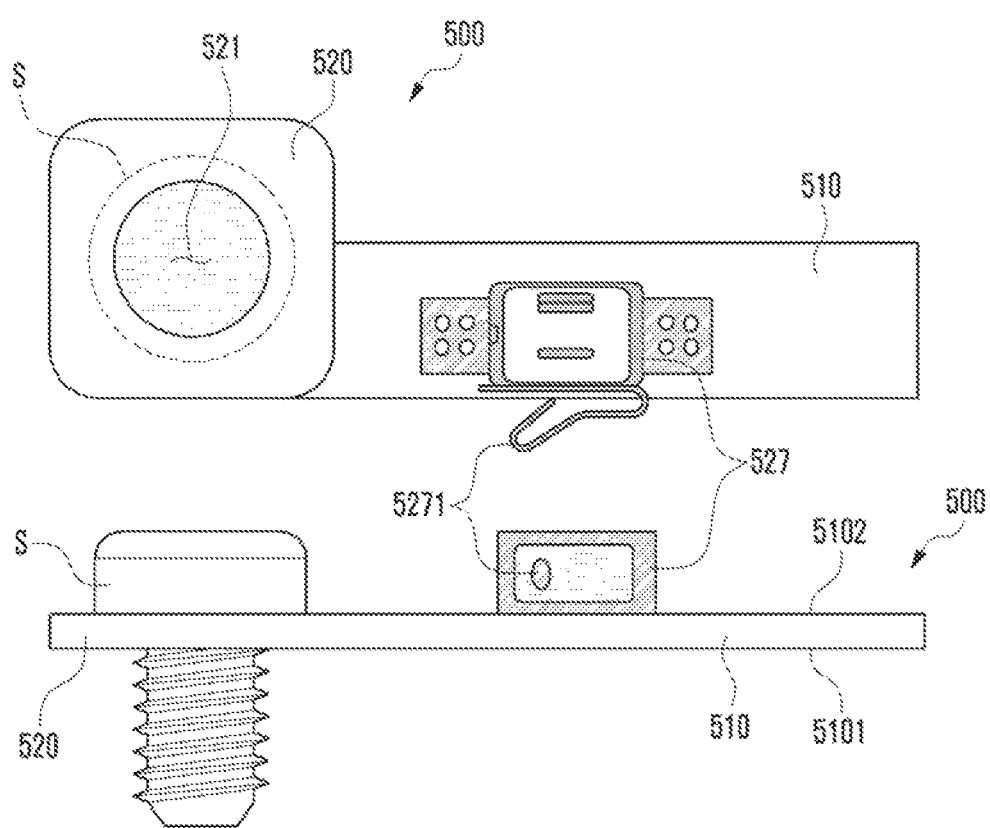
FIG. 13A is a configuration view of an electrical connection member including a conductive contact according to various embodiments of the disclosure.
Figure 13B:
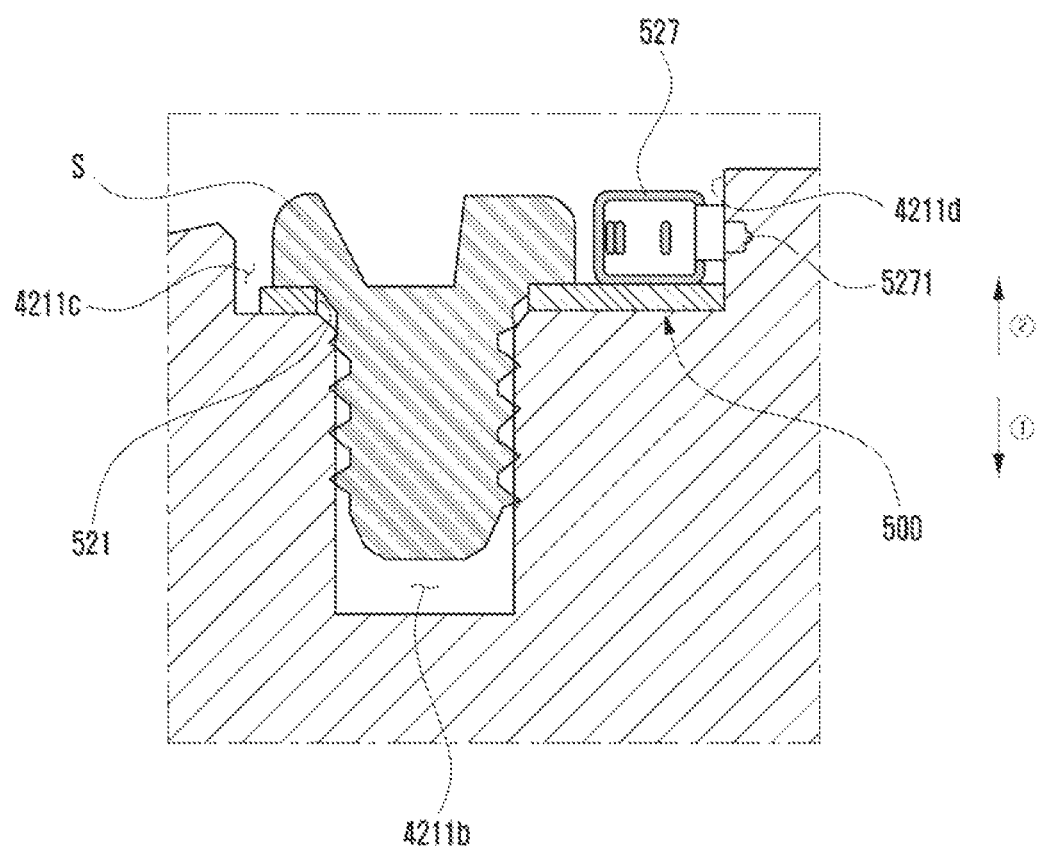
FIG. 13B is a cross-sectional view illustrating a state in which an electrical connection member including a conductive contact according to various embodiments of the disclosure is fixed to a conductive portion by a locking device.

FIG. 13A is a configuration view of an electrical connection member 500 including a conductive contact 527 according to various embodiments of the disclosure. FIG. 13B is a view illustrating a state in which the electrical connection member 500 including the conductive contact 527 according to various embodiments of the disclosure is fixed to a conductive portion 4211 by a locking device S.

Referring to FIG. 13A, the electrical connection member 500 may include a plate portion 510 and a first fixing portion 520 disposed at an end of the plate portion 510. According to an embodiment, the first fixing portion 520 may include a through hole 521 through which the locking device S passes. According to an embodiment, the electrical connection member 500 may include a conductive contact 527 disposed in the periphery of the through hole 521 and including an elastic contact portion 5271. According to an embodiment, the conductive contact 527 may be disposed on a second surface 5102 of the electrical connection member 500. According to an embodiment, the conductive contact 527 may include a C-clip, a pogo pin, or an elastic spring. According to an embodiment, the conductive contact 527 may be disposed on the second surface 5102 and protrude in a direction perpendicular to the second surface 5102.

Referring to FIG. 13B, the conductive portion 4211 may include a recess 4211c including a fastening hole 4211b and provided to be lower than the outer surface of the conductive portion 4211. According to an embodiment, when the electrical connection member 500 is fastened to the conductive portion 4211 by the locking device S, the elastic contact portion 5271 of the conductive contact 527 may come into contact with an inner wall of the recess 4211c with elasticity. According to an embodiment, even if an electronic device (e.g., the electronic device 400 of FIG. 4) is subjected to an external impact and the locking device S is partially released, the continuous contact structure between the electrical connection member 500 and the conductive portion 4211 may be maintained by the elastic contact portion 5271 of the conductive contact 527 that is in contact with the inner wall 4211d of the recess 4211c with elasticity. Therefore, even if the locking device S is partially released, since the continuous physical contact between the electrical connection member 500 and the conductive portion 4211 is maintained by the conductive contact 527, it is possible to prevent degradation of the radiation performance of the conductive portion 4211 used as an antenna radiator.

Figure 14:
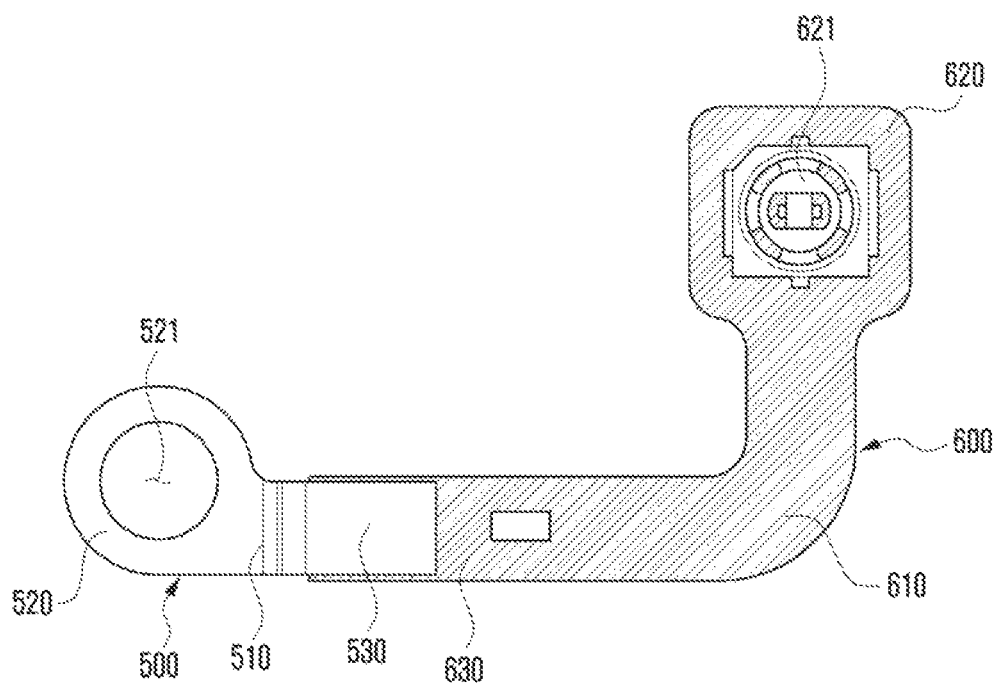
FIG. 14 is a plan view illustrating a state in which an electrical connection member and a flexible substrate (a flexible printed circuit board (FPCB)-type RF cable) according to various embodiments of the disclosure are connected to each other.

FIG. 14 is a view illustrating a state in which an electrical connection member 500 and a flexible substrate 600 according to various embodiments of the disclosure are connected to each other.

Referring to FIG. 14, the electrical connection member 500 may be fixed to the flexible substrate 600 (e.g., a flexible printed circuit board (FPCB)-type RF cable) connected to a substrate (e.g., the printed circuit board 340 of FIG. 3) of an electronic device (e.g., the electronic device 300 of FIG. 3). According to an embodiment, the flexible substrate 600 may include a connection portion 610 having a specified length and shape. According to an embodiment, the flexible substrate 600 may include a connector 621 disposed at one end 620 of a connection portion 610 and connected to a receptacle of a substrate (e.g., the printed circuit board 340 of FIG. 3). According to an embodiment, the other end 630 of the flexible substrate 600 may be fixed to the electrical connection member 500.

According to various embodiments, the electrical connection member 500 may include a plate portion 510, a first fixing portion 520 electrically connected to a conductive portion (e.g., the first conductive portion 4211 of FIG. 4) used as an antenna radiator of the electronic device (e.g., the electronic device 400 of FIG. 4) via a locking device passing through a through hole 521 at one end of the plate portion 510, and a second fixing portion 530 electrically connected to the other end 630 of the flexible substrate 600 at the other end of the plate portion 510. According to an embodiment, the second fixing portion 530 may be electrically connected and fixed to the other end 630 of the flexible substrate 600 through a soldering process.

Figure 15A:
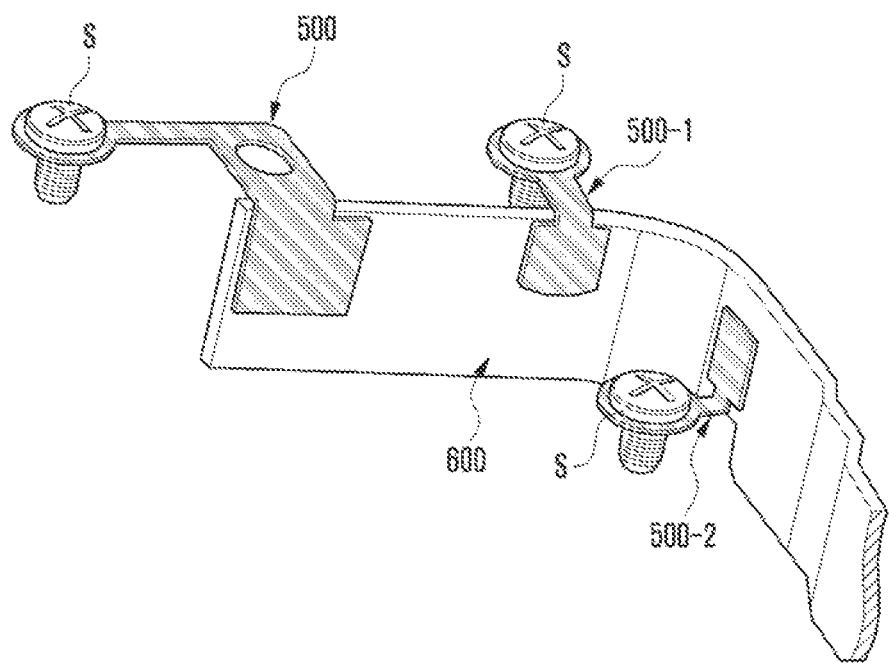
FIG. 15A is a perspective view illustrating a flexible substrate to which a plurality of electrical connection members are fixed according to various embodiments of the disclosure.
Figure 15B:
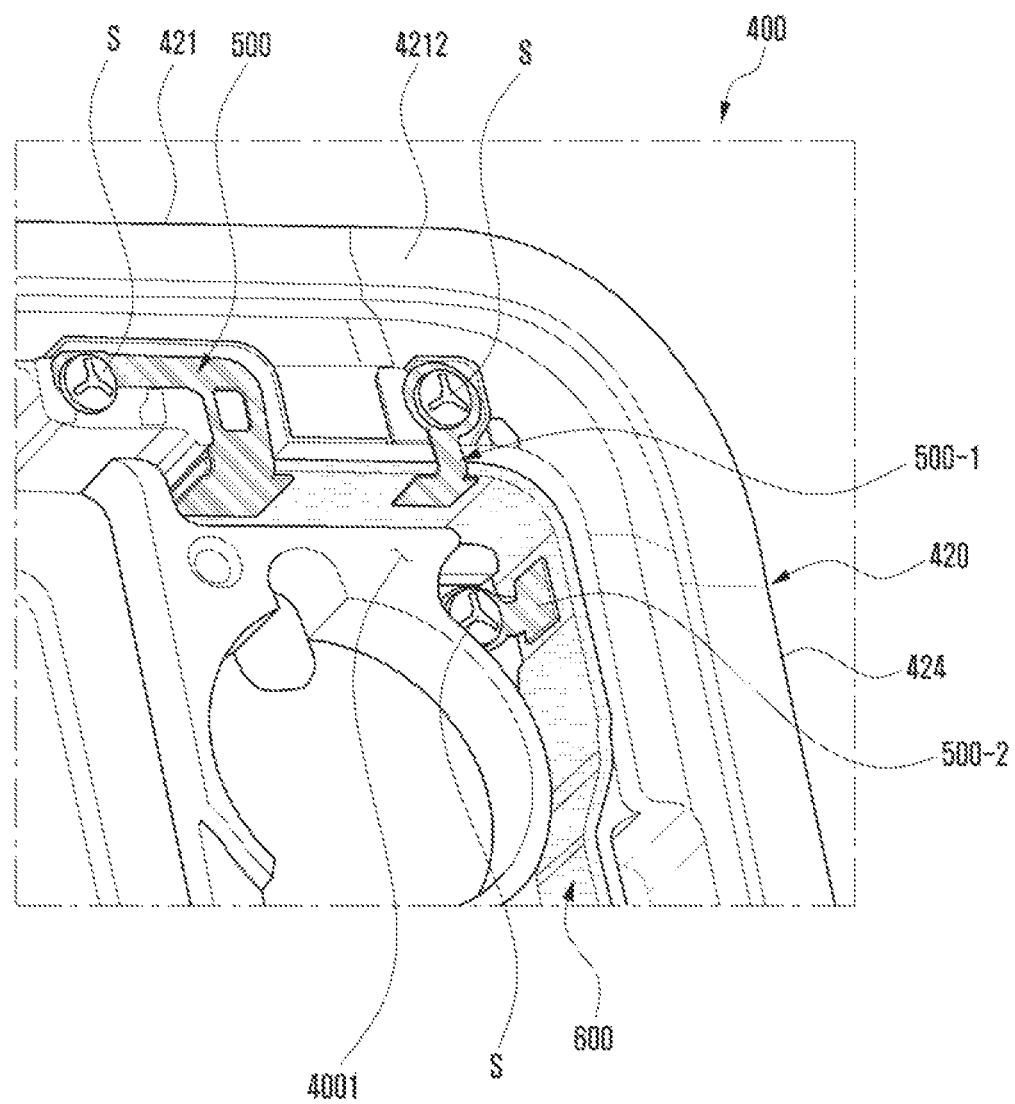
FIG. 15B is a perspective view illustrating a state in which a flexible substrate including a plurality of electrical connection members according to various embodiments of the disclosure is disposed in an electronic device.

FIG. 15A is a view illustrating a flexible substrate to which a plurality of electrical connection members are fixed according to various embodiments of the disclosure. FIG. 15B is a view illustrating a state in which a flexible substrate 600 including a plurality of electrical connection members 500, 500-1, and 500-2 according to various embodiments of the disclosure is disposed in an electronic device.

Referring to FIG. 15A, the flexible substrate 600 may include a plurality of electrical connection members 500, 500-1, and 500-2 spaced apart from each other by a predetermined interval and fixed to the flexible substrate 600 in the same manner as that illustrated in FIG. 14. According to an embodiment, the flexible substrate 600 may be used when a substrate (e.g., the printed circuit board 340 of FIG. 3) is electrically connected to a conductive portion 4212 disposed relatively far from the substrate in the inner space 4001 of the electronic device 400. In this case, a plurality of electrical connection members 500, 500-1, and 500-2 may be fixed in such a way that the members are branched from at least a portion of the flexible substrate 600, and may be fixed to the corresponding conductive side surfaces 421 and 424 of the conductive side surface member 420 by locking devices S. For example, the flexible substrate 600 may be disposed to be bent in a corner portion where a first side surface 421 and a fourth side surface 424 of the conductive side surface member 420 meet in the inner space 4001 of the electronic device 400. In this case, a first electrical connection member 500 and a second electrical connection member 500-1 branched from the flexible substrate 600 may be fixed to a portion corresponding to the first side surface 421 by a locking device S, and the third electrical connection member 500-2 may be fixed to a portion corresponding to the fourth side surface 424 by a locking device S.

The embodiments of the disclosure disclosed in the specification and drawings are provided merely to propose specific examples in order to easily describe the technical features according to the embodiments of the disclosure and to help understanding of the embodiments of the disclosure, and are not intended to limit the scope of the embodiments of the disclosure. Accordingly, the scope of the various embodiments of the disclosure should be construed in such a manner that, in addition to the embodiments disclosed herein, all changes or modifications derived from the technical idea of the various embodiments of the disclosure are included in the scope of the various embodiments of the disclosure.

What is claimed is:

1. An electronic device comprising:
a housing;
a substrate disposed in the housing;
an antenna radiator; and
an electrical connection member electrically interconnecting the antenna radiator and the substrate,
wherein the electrical connection member comprises:

a plate portion comprising a first surface facing the antenna radiator and a second surface facing away from the first surface;

a first fixing portion provided at a first end of the plate portion, the first fixing portion comprising a through hole and a tension structure; and a second fixing portion provided at a second end of the plate portion and electrically connecting the electrical connection member to the substrate, wherein the first fixing portion is fixed to the antenna radiator via a locking device that passes through the through hole, and wherein the tension structure is configured to contact the antenna radiator and maintain tension between the electrical connection member and the antenna radiator during fastening of the locking device.

2. The electronic device of claim 1, wherein the tension structure comprises at least one tension rib extending from the first surface of the plate portion or the first fixing portion at a first angle.

3. The electronic device of claim 2, wherein the at least one tension rib extends from an end of the first fixing portion.

4. The electronic device of claim 2, wherein the first fixing portion comprises an opening spaced apart from the through hole, and wherein the at least one tension rib extends into the opening.

5. The electronic device of claim 1, wherein the tension structure comprises at least one tension rib extending in a direction parallel to the first surface from the through hole.

6. The electronic device of claim 5, wherein the at least one tension rib has a curved shape.

7. The electronic device of claim 6, wherein the at least one tension rib has a curvature that is smaller than a curvature of an inner diameter of the through hole.

8. The electronic device of claim 5, wherein the at least one tension rib protrudes beyond a plane defined by the first surface in a direction toward the antenna radiator.

9. The electronic device of claim 1, wherein the tension structure comprises a bend in the plate portion, and the through hole is disposed between an end of the first fixing portion and the bend.

10. The electronic device of claim 1, wherein the antenna radiator has a fastening hole in which the locking device is inserted to fix the first fixing portion to the antenna radiator, wherein a recess is provided in an outer surface of the antenna radiator around the fastening hole, and wherein the first fixing portion comprises a protrusion seated in the recess.

11. The electronic device of claim 10, wherein the tension structure comprises at least one tension rib disposed on the protrusion and extending outward from the protrusion to elastically contact an inner wall of the recess.

12. The electronic device of claim 11, wherein the at least one tension rib is disposed on the first surface and is at least partially bent in a direction in which the second surface is oriented.

13. The electronic device of claim 11, wherein the at least one tension rib extends outward from the protrusion through an opening in the protrusion.

14. The electronic device of claim 10, wherein the tension structure comprises a conductive contact disposed on the plate portion or the first fixing portion, and configured to continuously provide a contact force to an inner wall of the recess.

15. The electronic device of claim 1, wherein the antenna radiator comprises a unit conductive portion provided via at least one non-conductive portion in a portion of the housing.

16. The electronic device of claim 15, wherein the unit conductive portion forms a portion of an exterior of the electronic device.

17. The electronic device of claim 1, further comprising a flexible substrate disposed between the electrical connection member and the substrate and electrically connected to the substrate, wherein the second fixing portion of the electrical connection member is electrically connected to the flexible substrate.

18. The electronic device of claim 1, wherein the first fixing portion is fastened to the antenna radiator in a direction parallel to the substrate.

19. The electronic device of claim 1, wherein the first fixing portion is fastened to the antenna radiator in a direction perpendicular to the substrate.

20. The electronic device of claim 15, wherein the antenna radiator is disposed in the housing.

* * * * *